United States Patent
Farchmin et al.

(10) Patent No.: US 8,032,250 B2
(45) Date of Patent: Oct. 4, 2011

(54) LOCATION BASED PROGRAMMING AND DATA MANAGEMENT IN AN AUTOMATED ENVIRONMENT

(75) Inventors: David Walter Farchmin, Grafton, WI (US); David D. Brandt, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 12/201,458

(22) Filed: Aug. 29, 2008

(65) Prior Publication Data
US 2008/0319567 A1   Dec. 25, 2008

Related U.S. Application Data

(60) Continuation of application No. 11/351,866, filed on Feb. 10, 2006, now Pat. No. 7,437,212, which is a division of application No. 10/367,986, filed on Feb. 14, 2003, now Pat. No. 7,043,316.

(51) Int. Cl.
*G06F 19/00* (2006.01)
*G06F 17/00* (2006.01)
*G05B 15/02* (2006.01)

(52) U.S. Cl. ............ 700/221; 700/90; 700/95; 700/116; 709/222; 709/229

(58) Field of Classification Search .................. 700/90, 700/116, 221; 709/222, 229
See application file for complete search history.

(56) References Cited

U.S. PATENT DOCUMENTS

| 5,598,572 | A | 1/1997 | Tanikoshi et al. | |
| 5,963,134 | A * | 10/1999 | Bowers et al. | 340/572.1 |
| 5,978,753 | A | 11/1999 | Eidson | |
| 6,330,971 | B1 * | 12/2001 | Mabry et al. | 235/383 |
| 6,847,856 | B1 | 1/2005 | Bohannon | |
| 2001/0049595 | A1 | 12/2001 | Plumer et al. | |
| 2002/0082720 | A1 | 6/2002 | Birzer et al. | |
| 2003/0077153 | A1 * | 4/2003 | Elliott et al. | 414/281 |
| 2003/0185237 | A1 | 10/2003 | Baker | |
| 2003/0208302 | A1 | 11/2003 | Lemelson et al. | |
| 2004/0073850 | A1 | 4/2004 | Opaterny | |

FOREIGN PATENT DOCUMENTS

WO   0182032 A2   11/2001

* cited by examiner

*Primary Examiner* — Michael D Masinick
(74) *Attorney, Agent, or Firm* — Quarles & Brady LLP; Alexander R. Kuszewski; John M. Miller

(57) ABSTRACT

A method and system for providing information related to a set of automated resources that may cooperate in an environment to perform an automated process, the method comprising the steps of associating a specific environment location with the automated process, determining the locations of resources with respect to the specific location and, where resources are proximate the specific location, providing information related to the automated process. Also a method for facility communication between distributed resources where location or an attribute akin thereto is used to tag data and to monitor network data for specific required data.

23 Claims, 18 Drawing Sheets

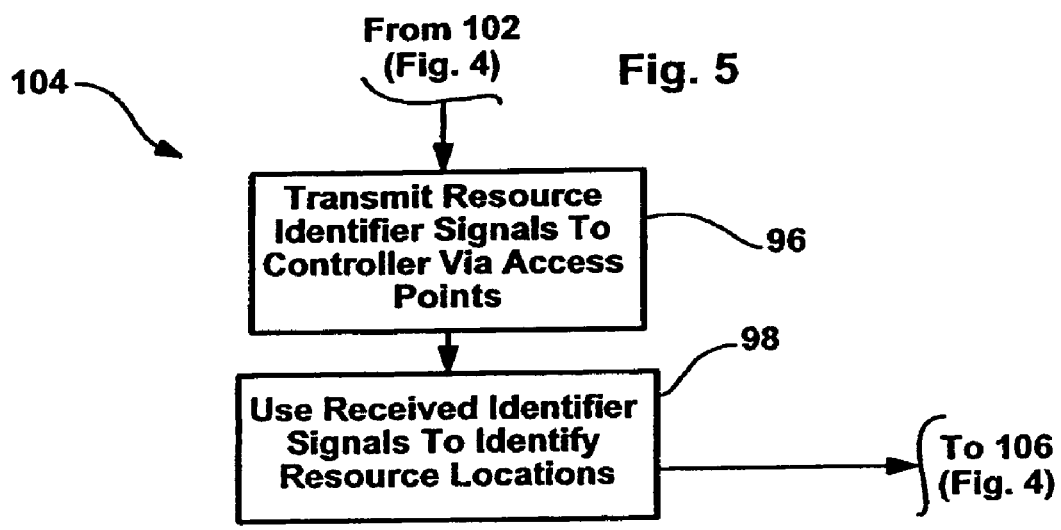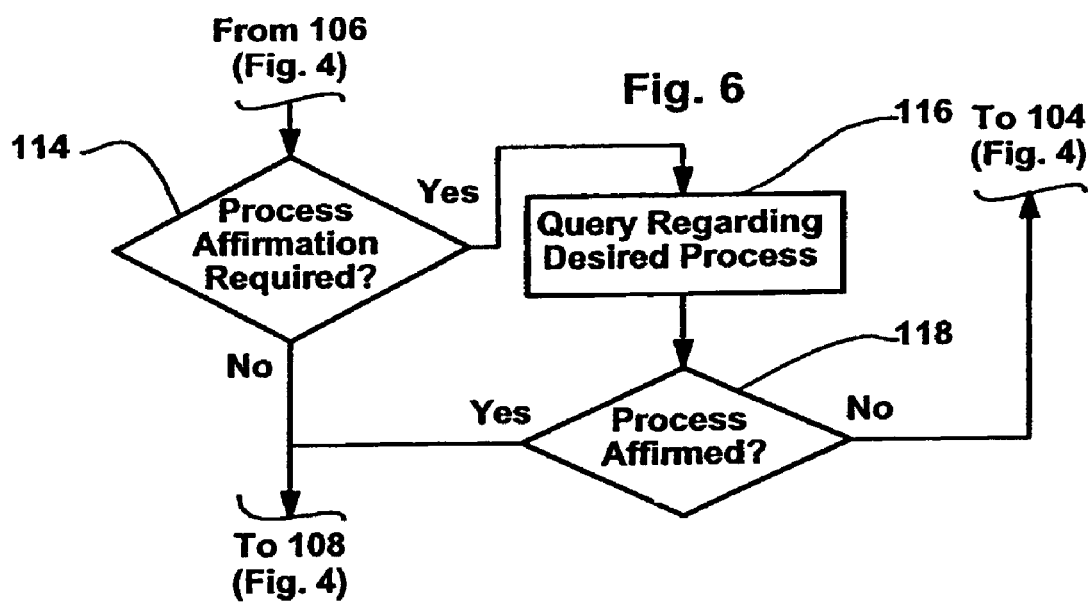

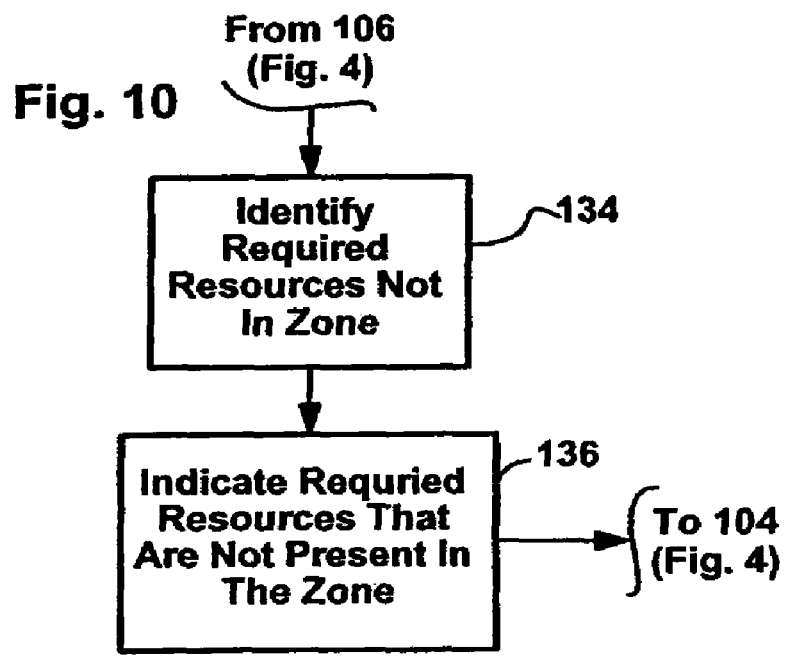
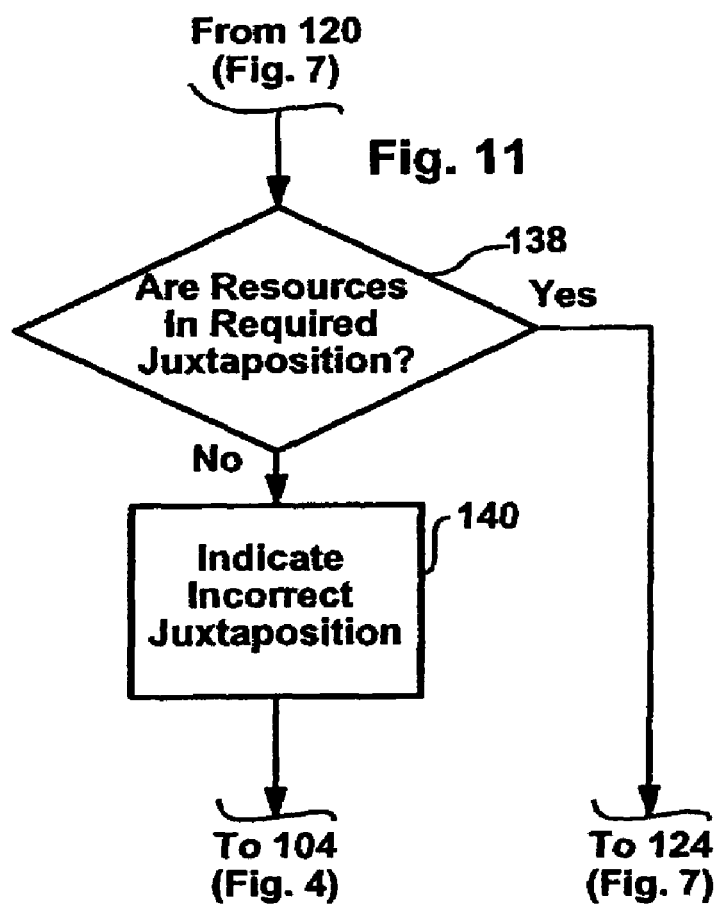

Automated Process Specifications (APSs)

| | Proc. Specific Resources Present | | | | | Phys. Spec. | | Comm. Procedure | | Interface Spec. | | Program Code | | Affirm Require. | Machine Zone | | Proc. Zone | |
|---|---|---|---|---|---|---|---|---|---|---|---|---|---|---|---|---|---|---|
| | R1r R2r R3r R4r R5r R100 | | | | | | r o | | r o | | r o | | r o | | r | o | r | o |
| P1 | a a . . . a | | | | | J1 | J3 | C1 | C2 | I1 | I2 | PC1 | PC2 | N | MZ1 | MZ2 | PZ1 | PZ2 |
| | a a . . . b | | | | | J1 | J4 | C3 | C3 | I5 | I3 | PC2 | PC8 | N | MZ9 | MZ3 | PZ3 | PZ2 |
| | a a . . . a | | | | | J3 | J2 | C7 | C7 | I9 | I2 | PC3 | PC3 | N | MZ7 | MZ6 | PZ5 | PZ2 |
| | b a . . b a | | | | | J8 | J1 | C5 | C5 | I1 | I2 | PC1 | PC5 | N | MZ1 | MZ2 | PZ5 | PZ2 |
| PN | ... | | | | | | | | | | | | | | | | | |

Fig. 12

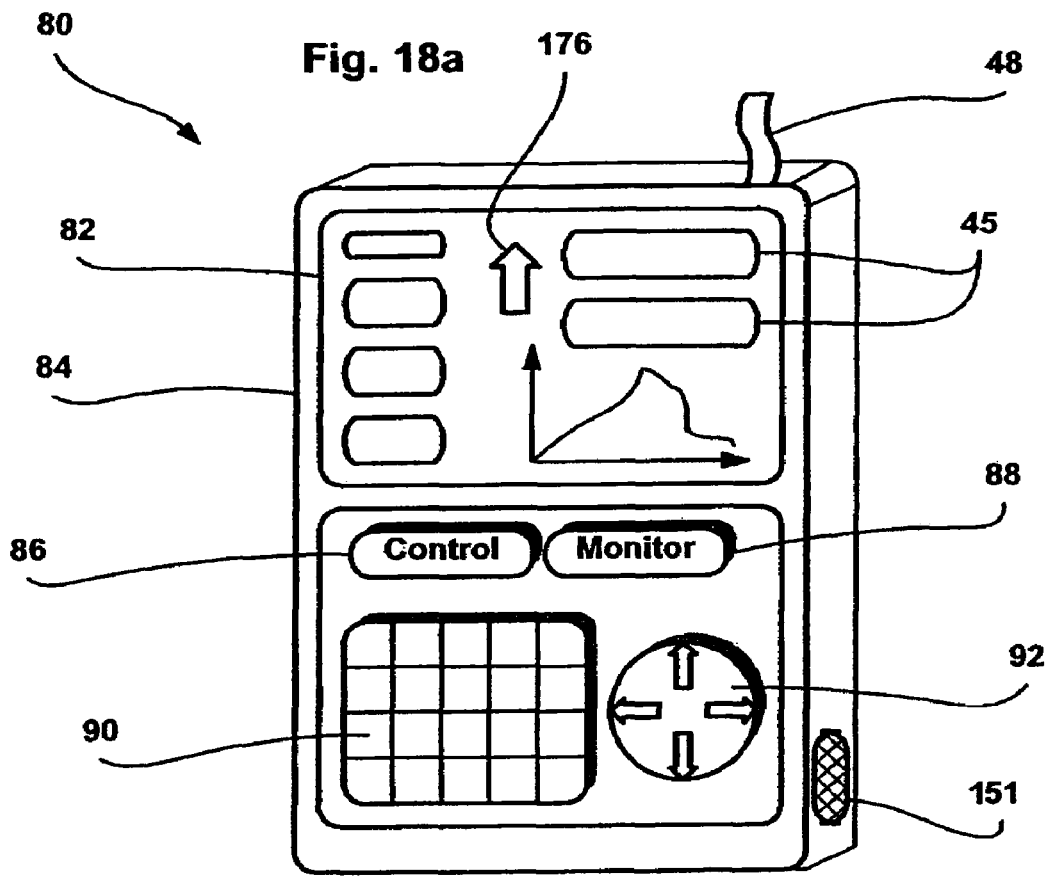
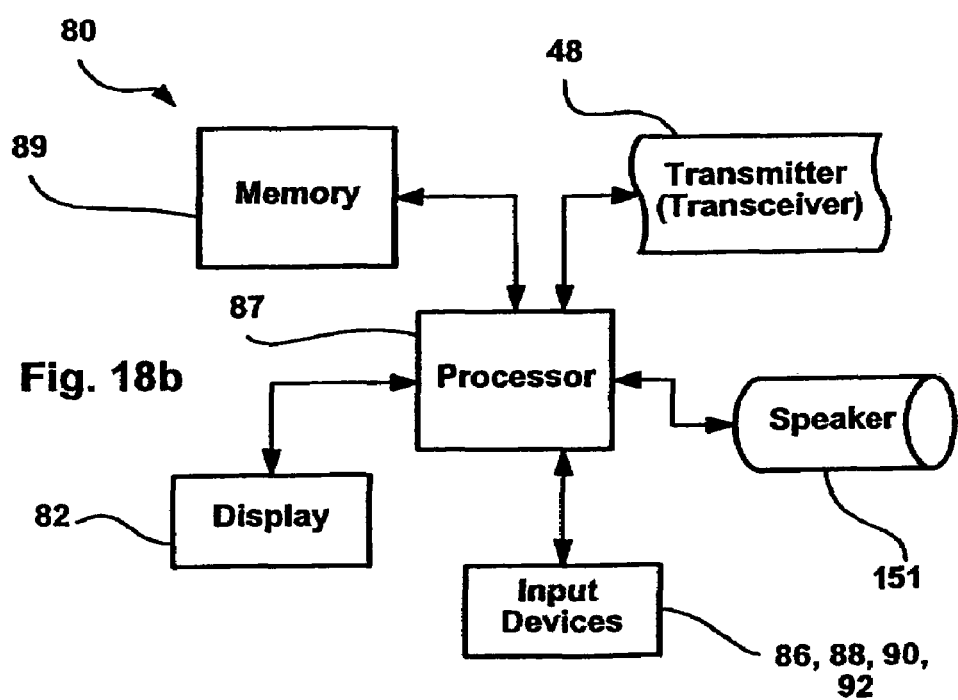

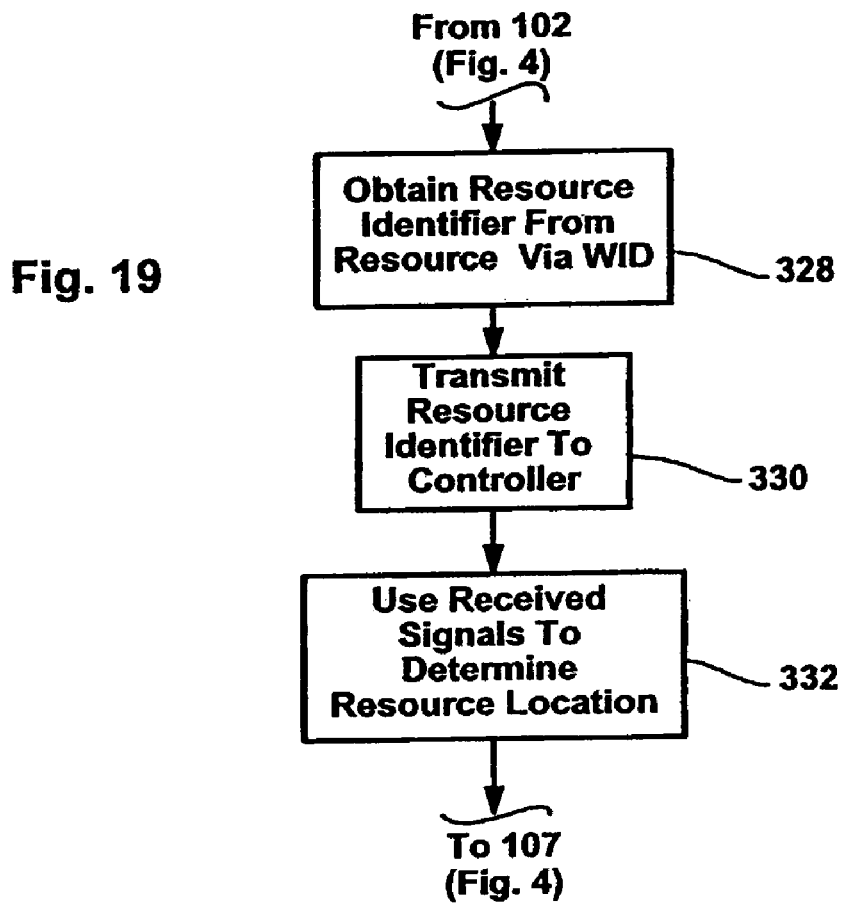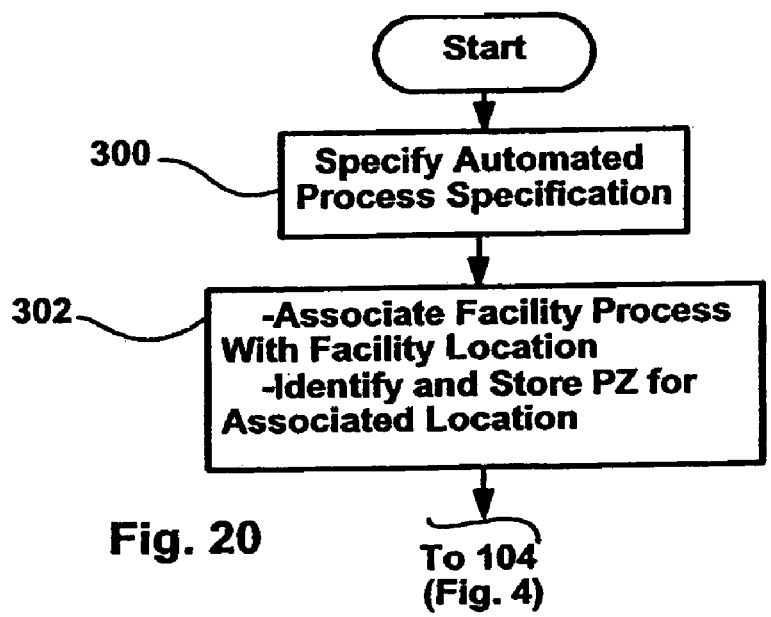

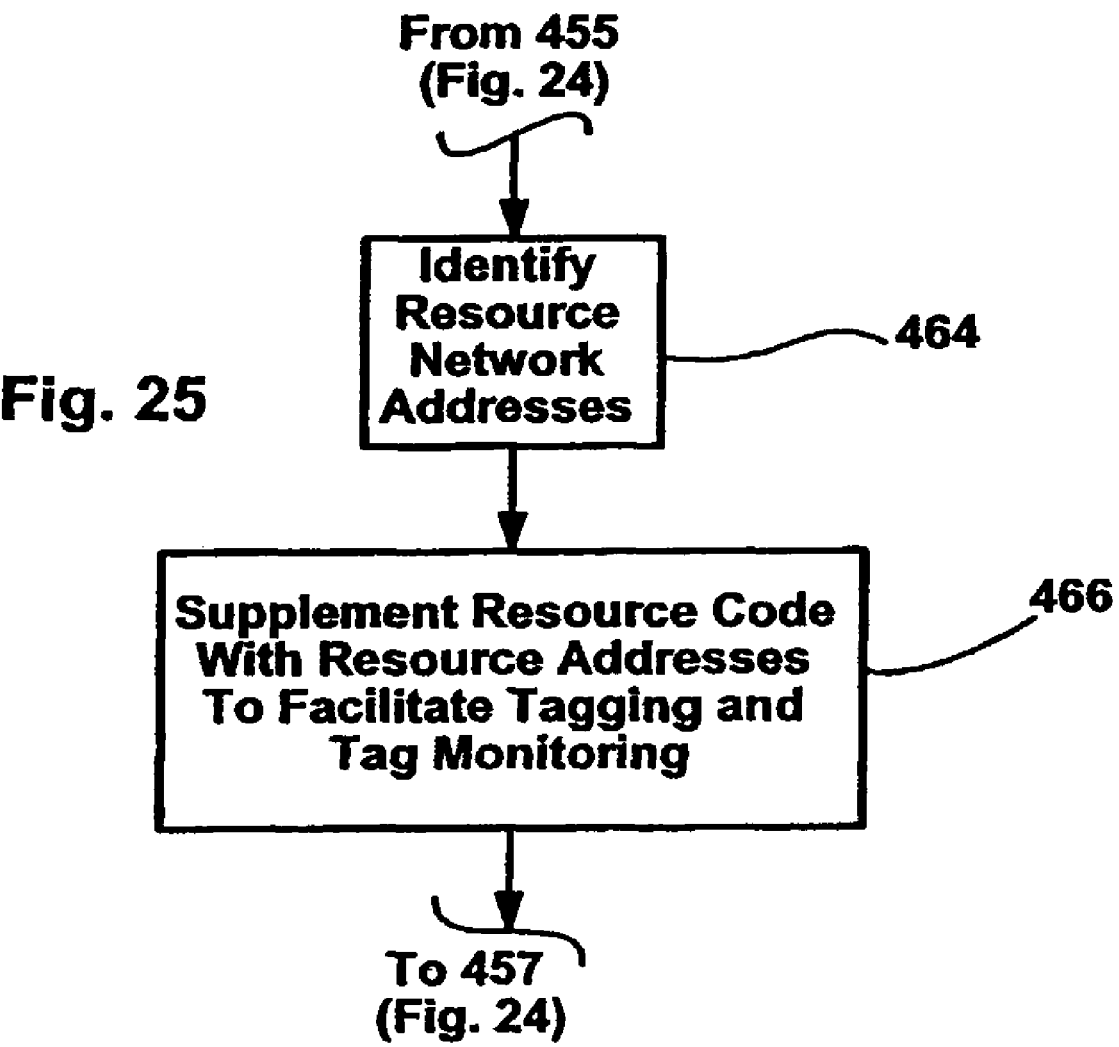

LOCATION BASED PROGRAMMING AND DATA MANAGEMENT IN AN AUTOMATED ENVIRONMENT

CROSS-REFERENCE TO RELATED APPLICATIONS

This application is a continuation of U.S. patent application Ser. No. 11/351,866 filed on Feb. 10, 2006, now U.S. Pat. No. 7,437,212 dated Oct. 14, 2008, which is entitled "LOCATION BASED PROGRAMMING AND DATA MANAGEMENT IN AN AUTOMATED ENVIRONMENT" which in turn was a divisional of Appl. No. 10/367,986, now U.S. Pat. No. 7,043,316 filed on Feb. 14, 2003 and entitled "LOCATION BASED PROGRAMMING AND DATA MANAGEMENT IN AN AUTOMATED ENVIRONMENT" and claims priority to both the application and issue patent.

STATEMENT REGARDING FEDERALLY SPONSORED RESEARCH OR DEVELOPMENT

Not applicable.

BACKGROUND OF THE INVENTION

The field of the invention is controller programming and communication and more specifically location based data management and automated programming of controllers/communication machines when controllers/machines are moved to facility locations in which the controllers/machines may be suitable to perform automated processes or sub-processes.

A visit to virtually any modern manufacturing facility in the world leaves room for little doubt that assembly/machine lines have become an integral part of the manufacturing process. Robots, computers, programmable logic controllers, mills, drills, stamps, clamps, sensors, transfer bars, assemblers, etc., are more numerous than people in most modern manufacturing facility. Automation has been widely embraced in great part because almost every industry has recognized that use of automated assembly/machine lines to form and assemble product components and assemblies reduces manufacturing time and product costs and increases product quality.

While automation has many advantages, one of the most important shortcomings associated with automation is that automated systems are relatively expensive to develop, construct and debug. Some efforts to reduce automation costs have focused on increasing the flexibility of the resources (e.g., machines, sensors, actuators, controllers, interfaces, etc.) used to construct and operate machine lines. Flexibility efforts have generally been focused on reducing costs by providing machines that can be controlled by a programmable controller or a group of cooperating distributed controllers to perform different machine cycles. For example, instead of maintaining several different types of single axis drill presses that are capable of performing different machining functions, a facility may obtain a single robot based multi-axis drilling machine that can be controlled to provide an array of desired capabilities. As another example, a pellet dryer for use in drying plastic pellets for use in a rotational molding process and an associated auger may be controlled to have different length drying cycles, different drying temperatures, different air flow rates, different agitation and auger speeds and so on to provide pellets that have ideal characteristics for any molding operation.

Yet one other example includes component insertion machines used to assemble printed circuit boards (PCBs). In the case of PCB assembly operations, a flexible insertion machine may include a multi-axis articulating arm controllable to perform many different movements and machinations such that circuit components can be moved along various paths toward their mounted positions. Multi-path capabilities are required in many cases as PCB components and machine parts may be differently juxtaposed in different applications and hence some paths that are clear in one application may be blocked in another application.

One other effort directed toward increasing system flexibility has been to render machines portable for easy movement within a facility. For example, the pellet dryer described above may be mounted on casters that facilitate easy movement about the facility from one rotational mold set up to another mold set up. For instance, a single dryer may be able to provide the drying function to a plurality of different mold set ups thereby reducing overall costs. For instance, assume five separate mold assemblies where each assembly performs a 30-minute molding cycle and the drying and pellet sub-cycles require only five minutes each. In this case, instead of using five separate dryer machines, one for each mold sub-set, molding cycles may be staggered and a single dryer machine may be moved between mold sub-sets to provide the drying requirement.

As another example, in the case of PCB assembly, component insertion machines may include casters for rapid movement from one facility location to another so that machine capabilities and different machine combinations can quickly be configured when required and the number of machines required to provide all capabilities can be appreciably minimized.

While automation flexibility works in theory, unfortunately, in reality, combining machines to facilitate automated processes is much more difficult than simply wheeling machines into relative proximity and activating the machines. For example, assume eighty machines are to be combined with twenty distributed controllers to perform a process where the controllers are linked together via a network (e.g., an Ethernet). In this example an operator (or group of operators) charged with configuring, commissioning and programming the machine group faces several challenges including placement of the machines in correct relative juxtapositions, linking machines appropriately to input/output terminals of respective controllers and providing program code to each controller to control associated machines. The industry has developed tools to help operators meet these challenges such as machine layout maps that indicate required machine juxtapositions, I/O maps that indicate required I/O linkages and control programs that have separate code segments earmarked for each of the separate controllers and that can be downloaded into the separate controllers after the controllers and related machines are associated with specific parts of a manufacturing process.

While each of these tools has proven valuable in the past, each of the tools has several shortcomings. For instance, in the example above including eighty machines and twenty controllers, assume that two of the machines include first and second identical PCB insertion machines that are to be placed next to each other along a transfer line but that each of the insertion machines is to perform a different insertion process where the process performed by the second machine must be performed after the process performed by the first machine. Here, if the wrong program code segments are loaded into each of the first and second machines a configuration/programming error may occur which may not be identified until a commissioning procedure is performed. Similar problems can occur where I/O linkages are incorrectly formed such that required signals are never transmitted or received by respective controllers.

One other challenge facing the operator in the above example is to make sure that all of the machine cycles required to facilitate a process are properly sequenced. In this regard, as well known in the controls art, to avoid damage to machine components and ensure that processes are performed in the correct sequence, often cycles to be performed by one machine must be tied to completion of other machine cycles. For instance, a PCB insertion machine for inserting a circuit on a board at an insertion station must not begin an insertion cycle until after a transfer line adjacent thereto has moved a board to an appropriate location at the insertion station. As another instance, where there are two different insertion machines at a single insertion station where machine components (e.g., robotic arms) have to move into the same space above the board at different and interleave times to perform various insertion cycles, machine cycles have to be consecutively sequenced to avoid damage to the robotic arms.

Sequencing is typically performed by providing some way for distributed controllers to exchange information related to the status of the machines being controlled by the controllers. For instance, in the case above where an insertion cycle is tied to transfer line movement, a transfer line cycle complete or parked signal may be required by the controller controlling the insertion machine prior to beginning the insertion cycle. Similarly, prior to initiating a transfer line movement a controller controlling a transfer line may require cycle complete or parked signals form each of the machines juxtaposed adjacent the transfer line. Information or data requirements are typically defined by the program code segments that are performed by the separate distributed controllers.

One way to exchange information between controllers is to program the controllers to actually address specific information to other specific controllers that need the information. For instance, in the case of an Ethernet network where each controller linked to the network includes its own unique address, parked signals can be directed to specific controllers that have require the information to perform some function. For example, in the case above where each of the transfer line and the second insertion machine require cycle complete and/or partial cycle complete signals from the first insertion machine, the controller controlling the first machine may be programmed to address required signals to each of the second insertion machine and the transfer line. Transfer systems where controllers specifically address data to other controllers will be referred to generally hereinafter as point-to-point systems.

Unfortunately point-to-point systems have several shortcomings. First, point-to-point systems complicate the controller programming task appreciably. In this regard, assume in the above example that seventy-nine of the eighty machines and nineteen of the twenty distributed controllers required to perform the process have been configured and that an insertion machine including its own distributed processor is retrieved to be added as the eightieth machine and twentieth controller. Here, in addition to positioning the eightieth machine, forming proper I/O linkages and providing the proper program code segment for the machine, the operator has to identify the Ethernet address of the insertion machine to be added and use that address to alter the program code segments performed by the other controllers that have to send data to the insertion machine's controller.

In addition, each of the addresses of the other controllers that requires information from the insertion machine's controller must also be identified and used to alter the insertion machine controller's program to address information to the other controllers. While this data addressing process may not be too burdensome in simple cases where there are only a small number of controllers, unfortunately complex automated systems may include tens or even hundreds of distributed controllers where each of the controllers may generate hundreds or even thousands of signals that have to be provided to other controllers and each of the controllers may require hundreds or even thousands of signals form other controllers. Thus, in many cases the task of addressing data between controllers is daunting.

Second, because point-to-point data addressing is cumbersome, such addressing can lead to many programming and mapping errors which appreciably complicates program debugging processes. Third, where specific data is required by many controllers, point-to-point data addressing requires excessive amounts of communication bandwidth as the same data must be transmitted separately from the source controller to each of the destination controllers. Fourth, where point-to-point communication schemes are employed it is difficult to synchronize machine operations as data arrives at receiving destination controllers at different times.

One solution for reducing bandwidth required to provide data to multiple controllers and to address some of the other shortcomings of point-to-point communication systems has been to adopt a producer/consumer communication protocol Generally, according to producer/consumer protocols, instead of earmarking data for delivery to specific destination controllers, data producers effectively mark data with "tags" that indicate the content of the associated data and broadcast the tagged data generally onto a communication network (e.g., an Ethernet). Thereafter, "consumer" controllers monitor the network for data having a tag indicating a particular type (e.g., data tagged to indicate content required by the consumer) of data and, when a required data type is identified, as the label implies, consume or use the tagged data to perform a related function. Data not required by a controller is simply ignored (i.e., is not consumed).

In addition to reducing required communication bandwidth, producer/consumer protocols minimize synchronization problems as multiple consumers can receive the same data at essentially the same time.

While producer/consumer communication protocols solve several of the problems associated with point-to-point communication protocols, unfortunately producer/consumer protocols typically do not eliminate the need for operators to specify controller addresses required for data tagging purposes. To this end, in most cases, consumer controllers require data (e.g., cycle or partial cycle complete signals, etc.) from specific other controllers. For instance, in the example above where an insertion machine with its own controller is being added to a pre-configured group of seventy-nine other machines and nineteen other distributed controllers, the insertion machine may initiate an insertion cycle when a parked signal from the controller controlling the transfer line is received. Here the transfer line controller must provide a parked signal on the network that is tagged so that other controllers, including the insertion machine controller, can identify the parked signal as being from the transfer line controller. In most cases this signal-producer controller association is facilitated by tagging the transfer line parked data with the transfer line controller network address and programming the insertion machine controller to consume parked signals tagged with the transfer line controller's address. Similarly, the insertion machine controller may require signals form many (e.g., 10) other controllers for sequencing purposes and hence may require other controller addresses to facilitate data consumption.

Also, ten of the twenty system controllers may require signals from the insertion machine controller to facilitate sequencing. Here, the address of the insertion machine controller must be provided to each of the other ten controllers to facilitate listening for data tagged as produced by the insertion machine controller.

Most large automated facilities include several instances of many machine types used in the facilities where each of the instances may have different characteristics. For example, a single facility that routinely performs PCB fabrication procedures may use ten different PCB insertion machine instances where each of the machine instances has a different set of sensors and actuators, a different physical foot print, has different movement and insertion capabilities, etc. In addition, in many cases any of several different instances of the same machine type may be useable with other machines to perform a single process.

Where several different instances of machine types are used within a single facility, all of the tasks associated with combining groups of machines and controllers to perform processes are further complicated. For instance, again assuming that an insertion machine with its own controller is being added to seventy-nine other machines and nineteen other controllers to perform a process. Also assume that there are first and second different instances of the insertion machine type where the different instances have disparate physical and operational characteristics. Here, while it may be appropriate to position the first machine instance at one location with respect to the other machines, it may be inappropriate to position the second machine instance at the same location due to differences in the physical footprints of the machines, space required for machine movements, I/O terminal requirements, etc.

In addition, because the first and second insertion machine instances have different compliments of sensors and actuators and have different movement capabilities, the program code segments required to control each of the insertion machines may be different. Similarly, the different program codes may require different sequencing data from the other nineteen distributed controllers to perform sequences. For instance, the first insertion machine may require only one transfer line parked signal from a transfer line controller while the second machine may require both the parked signal from the transfer line controller and a second parked signal from a redundant controller that monitors transfer line operation. Here, the operator must have knowledge about the sequencing requirements of each of the insertion machines and the addresses of the transfer line controller and the redundant controller so that the operator can provide the required address information to the controller of the selected insertion machine for listening on the network to identify properly tagged data to be consumed by the insertion machine controller.

One other feature of some automated systems that complicates configuration tasks is that various facility machines and controllers may be controlled in different ways to perform a sub-process or to control different sub-processes as a function of the characteristics of the compliment of machines associated with a particular process. For instance, in the example above where one of first and second insertion machine instances is to be combined with other machines to perform a process, at least some of the other machines may be programmable to alter sequencing requirements as a function of which of the first or second insertion machine instances is added to the combination. For example, the controller included with the first insertion machine instance may provide partial cycle complete signals as well as a cycle complete signal while the controller included with the second insertion machine instance only provides a cycle complete signal. Here, on one hand, when the first machine instance is added to the other machines to perform a process, it may be optimal that another machine in the combination be programmed to monitor the network for partial cycle complete signals from the first machine controller so that cycles performed by the other machine can be sequenced at least in part in parallel with the first machine cycle thereby speeding up completion of the overall process. On the other hand, when the second insertion machine instance is added to the machine combination to perform the process, the other machine may simply monitor for the cycle complete signal and consume that signal accordingly. Here, the operator must have knowledge of operational capabilities and associated data requirements of each machine used in a facility so that optimal program code segments can be selected for each distributed controller and to facilitate proper producer/consumer communication.

Yet one other complicating feature of some automated systems is that operational requirements of a specific machine/controller to perform a process in conjunction with other machines and controllers may be different depending upon location or relative juxtaposition with respect to the other machines/controllers. For example, in some cases an operator may have the option to configure a set of machines including a PCB insertion machine in either one of the two different configurations to produce the same end product. In one configuration the PCB insertion machine may be positionable along with other machines at a first station along a transfer line where several machines perform their subprocesses in parallel. In the second configuration the PCB insertion machine may be positionable alone at a second station along the transfer line to perform its sub-process after the other machines have completed their sub-processes. Here, the movements and cycle sequencing of the PCB insertion machine in the two configurations are completely different and hence different code and data mapping are required.

Thus, it would be advantageous to have a system that can aid facility operators in configuring specific machine/controller combinations quickly, precisely and optimally to perform automated processes, that reduces programming errors and that reduces the skill set required by operators charged with performing configuration processes.

BRIEF SUMMARY OF THE INVENTION

Hereinafter, unless indicated otherwise, the term "resource" will be used broadly to refer to any equipment required to perform any part of an automated process including a controller, a machine (e.g., drill, mill, insertion machine, dryer, robotic press, etc.), a sensor, an actuator, an I/O rack, a human-machine interface (HMI), etc., or any combination of the above.

It has been recognized that resource location can be employed as an attribute for identifying various types of process information corresponding to an automated process associated with the resource and the specific location. More specifically, resource location can be employed to automatically provide information useable to configure a resource or group of resources to perform an automated process. The information may be manually useable by an operator to configure the resources to perform the process, may be used automatically to configure the resources to perform the process or may be used automatically to configure the resources to perform part of the process while the operator performs complimentary manual steps to configure other aspects of the resource combination to complete the process.

Exemplary types of location related information provided include but are not limited to program code segments, machine juxtaposition requirements, I/O mapping requirements, commissioning program code segments, juxtaposition verification information, etc.

In several embodiments of the invention information provided will be a function of the process associated with a location and the characteristics of a specific resource instance at a location where there are several instances of a resource type employed within a facility and each instance has different characteristics. In addition, in some embodiments the information provided will be a function of the characteristics of all of the resources located at a specific location.

In some embodiments of the invention resource locations or relative juxtapositions are used to facilitate data mapping and communication between distributed controllers. For instance, in the case of point-to-point communication systems, when resources are combined to perform a process, the relative juxtapositions of the resources can be used to determine data mapping requirements and address specific controller data to other controllers that have a need for the specific data. In the case of consumer-producer communication systems the relative juxtapositions or, in some cases specific locations of resources, are used to tag data generated by the resources with location tags or tags akin thereto prior to transmitting the data onto a network. In addition, the location information is used to supplement controller code segments so that the segments monitor network data for location tags corresponding to resources at locations from which data is required. When required data is identified, the identifying controller consumes the data. The inventive data mapping aspects may be used in hybrid systems including both point-to-point and producer-consumer communication protocols.

Consistent with the above, the invention includes a method for providing information related to a set of resources that cooperate in an environment to facilitate a process, the method comprising the steps of moving at least a first resource within the environment, determining the physical location of the first resource within the environment, determining if the first resource is one of the set resources, if the first resource is one of the set resources, identifying process information related to the resource set as a function of the location of the first resource and providing the process information.

The invention also includes a method for providing information related to a set of resources that may cooperate in an environment to perform a process, the method comprising the steps of associating a specific environment location with the process, determining the locations of set resources with respect to the specific location and where at least one set resource is proximate the specific location, providing information related to the process.

In addition, the invention contemplates a method for establishing communication between a set of resources in an environment wherein at least a sub-set of the resource set is linked via a network, at least a first of the resources generating data useable by other resources to perform various functions, the method comprising the steps of identifying the physical location of the first resource within the environment as a first location, when the first resource generates data, tagging the data as produced at the first location and transmitting the location tagged data onto the network.

Moreover, the invention includes a method for establishing communication between a plurality of resources in an environment wherein the resources communicate via a network, at least a first of the resources located at a first physical location within the environment generating data useable by other resources to perform various functions, tagging data generated thereby to indicate that the data is produced at the first location and transmitting the location tagged data onto the network, the method comprising the steps of for at least a second resource, monitoring the network for data tagged as being produced at the first location and when data tagged as being produced at the first location is identified, using at least some of the data to perform a function.

Furthermore, the invention includes a method for facilitating resource configuration where a set of resources are to be combined to perform a process within a space wherein the process includes a plurality of sub-processes, the method comprising the steps of identifying resource locations within the space and associating the sub-processes with the resources as a function of the resource locations.

One other aspect of the invention contemplates a method for providing information related to a set of resources that cooperate in an environment to facilitate a process, the method comprising the steps of moving at least a first resource within the environment, determining the relative juxtaposition of the first resource to at least a sub-set of the set resources, determining if the first resource is one of the set resources, if the first resource is one of the set resources, identifying process information related to the resource set as a function of the relative juxtaposition of the first resource to the sub-set of the set resources and providing the process information.

Yet another aspect of the invention includes a method for use with a resource set configurable to perform a process, the set including at least a first programmable resource, the method for programming the resources and comprising the steps of providing program code for performing the process wherein the code includes a separate code segment for each of a sub-set of the programmable resources, a resource corresponding to a code segment being a related resource, for at least one code segment, providing a required relative juxtaposition of a related resource to other set resources, moving at least a sub-set of the set resources, identifying relative juxtapositions of set resources, where a programmable resource is within a required relative juxtaposition of other set resources, using an associated code segment to program the programmable resource.

In addition, the invention contemplates a method for use with a resource set configurable to perform a process, the set including at least a first programmable resource, the method comprising the steps of providing program code for performing the process wherein the code includes a separate code segment for at least a sub-set of the programmable resources and, wherein, at least a first code segment provided for a first programmable resource requires data from a second resource in a specific physical juxtaposition relative to the first resource.

Moreover, the invention further contemplates a method for use with a set of resources to perform a process wherein the resources include at least one programmable resource, the method comprising the steps of provide code segments for each programmable resource in the set wherein at least a sub-set of the code segments require data from other code segments and wherein the segments express data requirements at least in part via relative locations of resources.

One other aspect of the invention includes a system for providing information related to a set of resources that cooperate in an environment to facilitate a process, the system comprising a position determiner for determining the physical location of the first resource within the environment, a database storing process information related to the resource set, a processor linked to the position determiner and the database and programmed to determine if the first resource is one of the set resources, if the first resource is one of the set resources, identify process information in the database related to the resource set as a function of the location of the first resource and provide the process information.

Another aspect of the invention contemplates a system for establishing communication between a set of resources in an environment wherein at least a sub-set of the resource set is linked via a network, at least a first of the resources generating data useable by other resources to perform various functions, the system comprising a location determiner for identifying the physical location of the first resource within the environment as a first location, a processor for: when the first resource generates data, tagging the data as produced at the first location and transmitting the location tagged data onto the network.

Yet one more aspect of the invention includes a system for establishing communication between a plurality of resources in an environment wherein the resources communicate via a network, at least a first of the resources located at a first physical location within the environment generating data useable by other resources to perform various functions, tagging data generated thereby to indicate that the data is produced at the first location and transmitting the location tagged data onto the network, the system comprising a processor associated with at least a second resource, the processor programmed to: monitor the network for data tagged as being produced at the first location and when data tagged as being produced at the first location is identified, use at least some of the data to perform a function.

Some embodiments of the invention include a system for facilitating resource configuration where a set of resources are to be combined to perform a process within a space wherein the process includes a plurality of sub-processes, the system comprising a processor programmed to: identify resource locations within the space and associate the sub-processes with the resources as a function of the resource locations.

Some embodiment include a system for providing information related to a set of resources that cooperate in an environment to facilitate a process, the system comprising a location determiner for determining the relative juxtaposition of the first resource to at least a sub-set of the set resources and a processor for: determining if the first resource is one of the set resources, if the first resource is one of the set resources, identifying process information related to the resource set as a function of the relative juxtaposition of the first resource to the sub-set of the set resources and providing the process information.

These and other aspects of the invention will become apparent from the following description. In the description, reference is made to the accompanying drawings, which form a part hereof, and in which there is shown a preferred embodiment of the invention. Such embodiment does not necessarily represent the full scope of the invention and reference is made therefore, to the claims herein for interpreting the scope of the invention.

BRIEF DESCRIPTION OF THE SEVERAL VIEWS OF THE DRAWINGS

FIG. 2b is a schematic diagram of various components that may be included in the device of FIG. 2a;

FIG. 5 is a flow chart illustrating a sub-process which may be included in the process of FIG. 4;

FIG. 6 is a flow chart illustrating another sub-process that may be included in the process of FIG. 4;

FIG. 10 is a flow chart illustrating yet one more sub-process that may be added to the process of FIG. 4;

FIG. 11 is a flow chart illustrating a sub-process that may be used to enhance certain aspects of the methods described above;

FIG. 12 is a second automated process specification similar to the specification illustrated in FIG. 3;

FIG. 18a is a perspective view of a wireless information device (WID) that may be used to facilitate certain aspects of the present invention;

FIG. 18b is a schematic diagram illustrating the various components of the WID illustrated in FIG. 18a;

FIG. 19 is a flow illustrating one additional sub-process that may be used to enhance the process of FIG. 4 above;

FIG. 20 is a sub-process that may be used to replace the beginning portion of the process of FIG. 4;

FIG. 25 is a sub-process that may replace a portion of the chart of FIG. 24.

DETAILED DESCRIPTION OF THE INVENTION

Figure 1A:
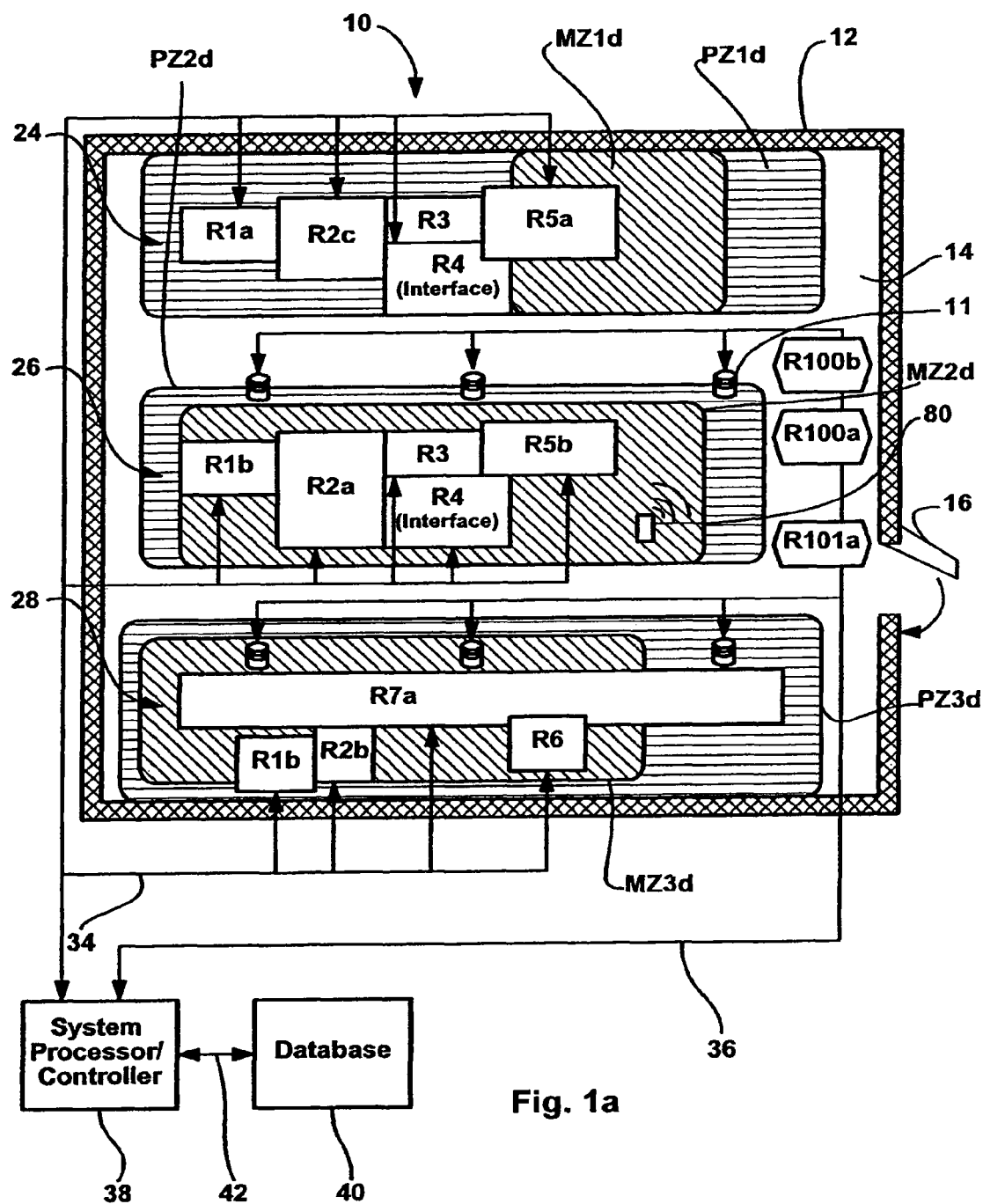
FIG. 1a is a schematic diagram of an exemplary control system in the context of an exemplary facility according to the present invention.

The present invention and various aspects thereof will be described in the context of several different embodiments in the specification that follows. It should be appreciated that the embodiments described are not meant to be exhaustive and that, while certain aspects will be described in the context of certain embodiments, most of the aspects may be employable in any of the described embodiments. The inventive embodiments can be divided into two general types including embodiments controlled centrally and embodiments controlled via distributed controllers. Hereinafter, embodiments including one or a small set of cooperating controllers will be described first and thereafter embodiments including distributed controllers or processors will be described.

In order to simplify this explanation some terminology must first be defined. In this regard, the term "resource" will be used to refer to any facility component that may be combined with other facility components to perform or enable an automated process, to control a process, or to monitor a process. For instance, a resource may be a machine such as a drill press, a pellet dryer, a PCB inserter, a transfer line, a mill, etc. A resource may also comprise a distributed controller or an interface device such as a workstation, a display terminal, etc. A resource may further include both a machine and a dedicated distributed controller. For example, a PCB insertion machine may include a built-in distributed controller dedicated to controlling insertion machine operations. Moreover, a resource may also include an I/O rack including a programmable controller and other resources (e.g., sensors, actuators, etc.) linked thereto. In some cases a resource may include a single sensor a actuator or a set thereof.

A. Exemplary System Components

Referring now to the drawings wherein like reference numbers correspond to similar elements throughout the several views and, more specifically, referring to FIG. 1a, the present invention will be described in the context of an exemplary, albeit simplified, manufacturing facility 10 that includes a rectilinear facility floor space or area 14 confined by four facility walls collectively identified by numeral 12. In the exemplary facility 10, the entire area 14 comprises a single room (i.e., there are no wall partitions within facility 10 and all of the facility resides on a single level). A doorway 16 is provided to allow access to area 14.

Exemplary facility 10 includes seventeen separate resources identified by labels R1a, R1b, R2a, R2b, R2c, R3, R4, R5a, R5b, R6, R7a, R100a, R100b and R101a. Labels R3, R4 and R1b are each used twice to indicate instances of the same resources type that have identical characteristics. For instance, each instance of label R4 is used to earmark a separate instance of an interface resource. The resources are shown as being different sizes to visually illustrate that the resources may have very different physical footprints. For example, resource R7a is illustrated as having a much larger physical footprint than resource R6. In general, the resources are spaced out within area 14 although, in some cases, resources may be positioned directly next to each other such as, for instance, resources R1a, R2c, R3, R4 and R5a in FIG. 1a.

The lower case letter qualifiers that follow some of the resource type labels are used to distinguish instances of a single resource type where the instance has some characteristic that is different, from a control perspective, than other instances of the same resource type. For example, labels R1a and R1b are used to earmark PCB insertion machines where the "a" and "b" qualifiers indicate that the each of the machines has machine characteristics that are distinct form the other.

In FIG. 1a, unless indicated otherwise, resources shown as rectangular blocks will be assumed to be resources that, while they may be mobile, are, at the very least, already present at a facility location and associated with a specific automated process to be performed. For instance, a first resource sub-set collectively identified by numeral 24 including resources R1a, R2c, R3, R4 and R5a within the top one third of facility space 14 are at least proximate each other and are assumed to be associated with a process to be performed at least in part by those resources. In some cases rectilinear resources will already be juxtaposed in their operating positions and I/O linkages will have been made for communicating with one or more system controllers (e.g., 38). In other cases one or more controllers linked to the rectilinear resources grouped together may already be controlling those resources via program code to perform the associated automated process. A second resource sub-set 26 and a third resource sub-set 28 in FIG. 1a include resources R1b, R2a, R3, R4 and R5b in the center one third of space 14 and resources R1b, R2b, R6 and R7a in the lower one third of space 14, respectively.

It will also be assumed that sub-sets 24 and 26 have each been configured to manufacture a first end product while sub-set 28 has been configured to manufacture a second end product that is different than the first product. While sub-sets 24 and 26 are each provided to manufacture the same end product, each sub-set includes at least some instances of the same resource types where instances of the same type may have different characteristics. For instance, again, resources R1a and R1b are each PCB insertion machines but the small letter qualifiers indicate that each of the machines has its own characteristic set (e.g., I/O, movement capabilities, sensors, actuators, etc.). Hereinafter, the process to be performed by each of the first and second sub-sets 24 and 26 will be referred to as first process P1 while the process to be performed by the third resource sub-set 28 will be referred to as second process P2.

Six sided resources such as resources R100a, R100b and M101a are assumed to be mobile (e.g., supported by casters) and not yet associated with specific automated processes in any fashion. Thus, for instance, unassociated resource R100b may eventually be associated with any of the first, second or third resource sub-sets 24, 26 or 28, respectively, if the programs associated with the sub-sets require a resource of type R100.

In FIG. 1a it is contemplated that many of the resources include at least one and, in many cases, a plurality of sensing devices (not illustrated) that sense resource operating characteristics and provide signals that can be used to facilitate resource monitoring and control via an interface. For instance, in the case of a drilling machine, sensors may include limit switches that are tripped when a drill slide reaches various positions along a travel path, on/off switches, speed sensing switches, motor operating characteristic sensors, etc. In addition, it is contemplated that many of the resources may also include various types of actuators used to begin, control and end resource cycles.

Most, if not all, facility resource sub-sets (e.g., 24, 26, 28, etc.) will include some type of control interface (e.g., interfaces R4) to facilitate sub-set control and process monitoring. For example, again, in the case of a drilling machine, drill slide stroke length may be altered, drill speed may be altered, the angle at which a drill bit enters a work piece may be altered, etc. As another example, in the case of a PCB insertion machine, the path that an articulating arm defines during movement may be altered, the timing of arm movement sequences may be altered, the pressure applied to components during picked up and insertion may be altered, etc.

According to the present invention, in addition to the components above, facility 10 is equipped so that a controller 38 can determine the locations of each mobile resource within the facility 10. Once the location of a resource within facility 10 is identified, the invention generally includes providing some type of process information related to how the located resource should be configured to cooperate with other resources proximate the located resource's location to perform an automated process.

Thus, according to the present invention, resource location can be used as an attribute (e.g., a "location attribute") to identify process information that in turn can be used to configure the located resource for cooperation with other facility resources to perform automated processes. More specifically, presence of a specific resource proximate a specific resource sub-set (e.g., 24, 26, 28, etc.) can be used to identify process information useable to combine the specific resource with the resource sub-set.

In some cases location determination may be commenced when a system operator performs some step in addition to steps typically required to combine resources to perform a process. For instance, after a first resource is positioned in a location proximate a resource sub-set that an operator intends to combine the first resource with, the operator may be required to activate a button indicating that controller 38 should determine the location of the first resource. The activation button may be on some type of interface known to be proximate the first resource. One interface type contemplated includes a stationary interface (e.g., a workstation or the like). Here, when an operator activates an interface button indicating that a resource is proximate the interface, resource location may be surmised through association with the interface location. One other interface type described in greater detail below includes a wireless information device (WID) including a transceiver (or just a transmitter in some embodiments) that can be used with wireless access points to determine WID location. Here, knowing that the WID is proximate the first machine, when WID location is determined, resource location can be surmised.

In other cases location determination may be automatically performed by controller 38 (i.e., may not require the system operator to initiate the location determination process). For instance, a transmitter or transceiver capable of communicating with wireless access points may be provided on each mobile resource so that resource location within facility 10 can be determined at any time in a manner completely transparent to the system operator. As another instance, each facility resource may be equipped with a limited power transmitter and a single resource in each sub-set to be combined may be equipped with a receiver. Here, the resource including the receiver may receive signals from proximate transmitters and determine proximity of other nearby resources.

As another instance, where hardwire I/O is required, when an operator links a resource to a system back plane that is in a known facility location, resource location can be surmised from the location of the backplane. Here, as in the case of wireless resource location systems, resource location can be determined automatically without requiring the operator to perform additional locating steps.

With respect to the location related process information provided after a resource location is determined, the process information may simply confirm for a system operator that the located resource is to be combined with other proximate resources. In addition, the process information may include information that instructs the operator how to physically combine (e.g., juxtapositions) the resource with proximate resources to perform an automated process. Moreover, the process information may include information useable by the controller to automatically control the resource and, perhaps, to control the proximate resources to perform the automated process. Still further, the process information may include information regarding required I/O linkages and commissioning procedures to configure the resources to perform an automated process. Furthermore, the information may include information useable to configure interfaces both for carrying out a commissioning process and for interfacing with an operator subsequently during performance of an automated process. Moreover, the process information may also include program code for supporting either fault type diagnostics or status based diagnostics where appropriate or required. Moreover, the process information may also customize program code as a function of the instances of resources to be combined and their specific locations with facility 10. Other information helpful in the configuration process is contemplated.

It is contemplated that there may be instances where a first resource is proximate other resources and the operator does not want the first resource to be combined with the other resources. Thus, at least some embodiments of the invention, after a resource is located proximate other resources, may require an operator to affirmatively indicate that automated resource configuration should commence thereby avoiding inadvertent and unintended configuration or resources or stoppage of resources already performing some type of automated process.

In this first exemplary embodiment it will also be assumed that, for each possible process/resource sub-set combination that may be configured in facility 10, a separate process specification has been specified. Thus, for instance, referring again to FIG. 1*a*, while it has been assumed that the same process P1 is performed by each of resource sub-sets 24 and 26 to assemble a first product, because different resource sub-sets (e.g., 24 and 26) are employed to perform the process where each sub-set includes resources with distinct resource characteristics (e.g., physical footprint, I/O, movement capabilities, etc.), different process specifications are provided for each of the sub-sets 24 and 26 where each specification may differ from the other with respect to required physical resource layout, I/O combinations, commissioning procedures, interface specifications, program codes and other control characteristics. Thus, once a specific combination is identified, associated process information can readily be identified and thereafter used to aid or carry out resource configuration.

While the inventive embodiments will be described herein as being supported by a voluminous data construct including separate process specifications for each process/resource sub-set combination and, in some cases, a separate process specification for each process/sub-set/physical specification combinations, it should be appreciated that the voluminous construct is assumed here to simplify this explanation and that other software architecture constructs are also contemplated. For instance, where a single process P1 is performed by two different resource sub-sets where the sub-sets differ only slightly (e.g., a first sub-set may include one interface type while the second sub-set includes a second interface type), another software construct may include a single process specification for the process supplemented by interface sub-specifications that may be chosen as a function of which interface resource is included in a resource sub-set. Other data constructs for supporting various configuration sub-sets are contemplated and should be known to one of ordinary skill in the programming art.

Hereinafter, unless indicated otherwise, first, an exemplary embodiment of the present invention will be described in context of a system where each mobile facility resource includes a transmitter and the facility includes access points linked to controller 38 where the transmitters, access points and controller cooperate to automatically identify resource locations.

Referring again to FIG. 1*a*, exemplary facility 10 includes a plurality of communication access points 11, system controller 38, a database 40, and a plurality of two-way data buses 34, 36 and 42. Controller 38 may be positioned within facility 10 or may be located at some remote location such as, for instance, in a separate building, in a separate room within the facility that includes area 14 or at a completely different location such as a remote campus associated with facility 10. In addition, in many industrial environments, controller 38 will be physically associated with specific machine lines so that the controller 38 may be positioned, for instance, at the front end of a line of resources to facilitate easy access to resource operating characteristics adjacent the resources and/or to allow operating characteristics to be altered in a proximate manner.

In FIG. 1*a*, controller 38 is linked to each of the facility resources via a two-way data bus 34 that allows controller 38 to monitor resource operating characteristics as well as control resource operation. Controller 38 is typically a processor (typically having programmable logic controller (PLC) capabilities) based workstation capable of running various types of computer programs. For instance, some programs are resource control programs that enable controller 38 to either separately control each resource or, safely and precisely sequence resource operation thereby allowing relatively complex manufacturing processes to be performed in an efficient manner. In addition, other controller programs may allow controller 38 to derive various resource operating characteristics from monitored or sensed characteristics (e.g., motor voltage and current data is useful to derive stator and rotor resistance estimates, system inductances, identify harmonics, determine system torques, etc.) and to run complex algorithms to identify operating trends, alarm conditions, potentially unsafe conditions, maintenance requirements, raw material requirements and so on. Moreover, controller 38 may also run programs that facilitate data management and warehousing so that subsequent algorithms may be applied to warehoused data to identify historical operating patterns for various purposes.

Furthermore, controller 38 may run programs designed to support interfacing with facility operators (e.g., maintenance personnel, process engineers, etc.) thereby providing control capabilities and system monitoring capabilities. To this end, controller 38 may include its own input and output interfacing devices such as a display screen, a keyboard, a pointing and selecting device such as a mouse or trackball or any other types of interfacing devices known in the art. Other interfacing devices (e.g., resources R4) are provided within facility 10 to enable monitoring and control.

Importantly, for the purposes of the present invention, controller 38 also runs a location determining program for determining the locations of resources (e.g., R1*a*, R100*a*, etc.) within facility 10. Furthermore, controller 38 runs programs to identify process information as a function of resource locations and provides process information for configuring resources as indicated above and described in greater detail below.

Controller 38 is linked via two-way data bus 42 to data base 40. Controller programs are stored in database 40. In addition, data generated by controller 38 is stored in database 40 and can be accessed to allow examination of historical resource operating characteristics, real time operating characteristics and any other data generated by algorithms performed by controller 38.

Referring still to FIG. 1*a*, each information access point 11 includes a two-way wireless transceiver that, as well known in the computer arts, is capable of transmitting and receiving electromagnetic (e.g., radio or infrared) signals within an area proximate the transceiver. Wireless transceivers like access points 11 are well known in the industry and therefore, in the interest of simplifying this explanation, will not be described here in detail. For the purposes of the present invention, it should suffice to say that each transceiver 11 transmits information signals, which decrease in strength as distances from the transceiver increase. In the illustrated example, six separate access points 11 are provided within area 14 and are generally equi-spaced within area 14. Typically, access points 11 will be mounted on the ceiling within an area 14 to allow relatively unobstructed communication between an access point 11 and other devices that communicate therewith. While access points 11 are illustrated as being substantially equi-spaced within area 14, it should be appreciated that other access point arrangements are contemplated and that, in many cases, other access point arrangements may be most suitable given specific resource layouts, the physical characteristics of each resource and likely machine zone and process zone layouts (described below).

Controller 38 is linked to each access point 11 via a two-way data bus 36 which allows controller 38 to receive information from the access points 11 and also allows controller 38 to provide information to each of the access points 11 for transmission within area 14. Information received from each access point 11 is typically tagged by the access point so that controller 38 can determine which access point 11 provided the received information. This tagging may either be performed by access point 11 earmarking data packets with an access point identifier (e.g., an access point number) or, in the alternative, may be facilitated by simply providing separate hardwires from each of the access points 11 to the controller 38. In a similar fashion, controller 38 and access points 11 are configured such that controller 38 can address information to each separate and specific access point 11.

Referring still to FIG. 1*a*, in at least some embodiments of the invention each of the mobile resources (e.g., R100*a*, R100*b*, R101*a* and perhaps some if not all of the rectilinearly illustrated sources) is equipped with a wireless transmitter (e.g., a wireless resource device (WRD)) that can wirelessly transmit information via electromagnetic communication or some other suitable wireless communication medium. Thus, generally, each mobile resource transmitter is equipped to communicate with any access point 11 in area 14.

It should be appreciated that, while the illustrated area 14 is relatively small, many industrial facilities may include much larger spaces such as, for instance, spaces including tens of thousands of square feet. In these cases, it is contemplated that the transmitting distance of a typical transmitter will be insufficient to transmit information to all access points within a facility. In other words, while a transmitter may be able to communicate with each access point 11 within a facility, communication will be limited by signal strength capabilities and reliable transmissions will require a transmitter proximate access points.

Referring yet again to FIG. 1*a*, according to at least one embodiment of the present invention, sub-spaces within area 14 are earmarked or identified as process zones associated with each of the separate machine sub-sets 24, 26 and 28. For instance, a space labeled PZ1*d* surrounding sub-set 24 is referred to hereinafter as the process zone associated with machine sub-set 24. Other labeled process zones in FIG. 1*a* include zones PZ2*d* and PZ3*d* associated with machine sub-sets 26 and 28, respectively. Each process zone corresponds to a sub-region within area 14 in which, when a resource is present, there is a high probability that the resource will be added to the sub-set of resources associated with the process zone to either enable an automated process to be performed, enhance an automated process or at least provide one additional resource required for a process to be performed. Thus, for instance, when each of resources R100a and R100b is outside process zone PZ1d, it is just as likely, based solely on location, that either of resources R100a or R100b will be combined with resource sub-set 24 to add process functionality. However, if resource R100a is moved into process zone PZ1d and resource R100b remains outside zone PZ1d, again, based solely on resource locations, it is relatively more likely that resource R100a as opposed to resource R100b will be combined with sub-set 24 to facilitate an automated process.

As indicated above, in at least some embodiments of the invention, it is contemplated that all of the resources that comprise a resource sub-set required to perform a process may be mobile. In these cases, it should be appreciated that the process zones will not be static but instead will be dynamic in the sense that the process zone areas will depend upon where resources are gathered to perform a process. For instance, in FIG. 1a, if resource sub-set 24 were gathered in a space near the bottom of facility 10 as illustrated (e.g., in the space occupied by sub-set 28 as illustrated), zone PZ1d would include a space similar to zone PZ3d near the bottom of facility space 14 as illustrated.

The "d" qualifier (e.g., PZ1d) included in each process zone label in FIG. 1a is used to indicate that a process (e.g., P1) associated with the zone has been "tied" to a specific facility location such that the boundaries of the specific process zone have been unambiguously designated. Thus, for example, while a zone PZ1 may be associated with a process P1 performed by a resource sub-set including resources R1a, R2c, R3, R4 and R5a, until the process P1 is associated with a specific facility location, the specific boundaries of zone PZ1 within facility 10 cannot be designated.

In other embodiments a facility may be pre-divided into separate process zones chosen to accommodate resource sub-sets. Thus, for instance, as in FIG. 1a, facility 10 may include three pre-defined or pre-designated process zones PZ1d, PZ2d and PZ3d within space 14. Larger facilities would likely include many (e.g., several hundred) different predefined process zones. In still other embodiments some facilities may include both predefined process zones and the capability to define dynamic process zones to accommodate mobile resources.

To minimize operator confusion, in at least one embodiment of the invention, adjacent process zones do not overlap. For example, the process zones corresponding to adjacent sub-sets 24 and 26 do not overlap. To further minimize the possibility of confusion, buffer zones or regions may be provided between process zones so that zones can be clearly distinguished from each other.

In some embodiments of the invention the process zones may be hysteretic such that, once a resource has been brought into the zone and associated with a specific sub-set of resources being configured to perform a specific process, the process zone space is expanded so that the resource can be more easily moved about the sub-set of resources without being taken out of the process zone to arrange the resource sub-set in a suitable juxtaposition. This hysteretic feature is particularly advantageous in cases where facility resources are rather cramped as the process zones may have to be restricted to relatively small spaces about associated resource sub-sets.

In at least some embodiments of the invention no physical markers are provided within area 14 to distinguish process zones and instead the zones are earmarked electronically on a facility map that resembles the schematic of FIG. 1a and that is stored in database 40 for access by controller 38. Where all of the resources to be combined to perform a process are mobile, process zones are determinable by controller 38 once a process is associated with a specific facility location. For instance, assume that a first resource R1a is located as illustrated in FIG. 1a but that all of the other resources adjacent thereto are not yet within zone PZ1d. Here, until resource R1a has been associated with the first process, when resource R2c is proximate resource R1a, there will be no association of the two resources for performing the first process P1. However, once the first process is associated with resource R1a, a zone PZ1d including resource R1a is designated and the process of monitoring for instances of resources M2, R3, R4 and M5 within zone PZ1d can commence.

Where process zones are pre-defined within a facility physical markers may be provided within facility 10 to aid operators in efforts to position mobile resources within facility 10. For instance, tape or paint may be provided on a facility floor to earmark process zone boundaries.

While there may be a most suitable or optimal process zone for a specific resource sub-set, in some embodiments of the invention, process zones selected by controller 38 will be a function of facility layout and other already existing process zones. For instance, referring again to FIG. 1a, assume that resources R1a, R2c, R3, R4 and R5a are all located proximate each other and that the resources in sub-sets 26 and 28 are not present within facility 10. In this case, process zone PZ1d associated with sub-set 24 may be expanded to include more space than illustrated (e.g., may include entire space 14). As another instance, if an operator brings an additional machine into facility 10 and associates the additional resource with a third process, process zones PZ1d, PZ2d and PZ3d illustrated in FIG. 1a may have to be altered to accommodate the additional resource and associated process.

In at least some embodiments process zones will change as a function of the number of resources located within the zones. For instance, referring again to FIG. 1a, assume that first process P1 has been associated with resource R1a and that, initially, only resources R1a and R2c of sub-set 24 are located proximate each other. Here, zone PZ1d may initially be much smaller than illustrated and include a space more proximate resources R1a and R2c. When resource R3 is retrieved and positioned proximate resources R1a and R2c, the initial process zone may be made larger to accommodate the additional resource and other resources to be added together to configure sub-set 24. This process of enlarging the process zone as a function of proximate related resources may continue until the entire resource sub-set has been configured.

In some embodiments process zones will also be a function of the characteristics of the instances of each resource type. In this regard, referring again to FIG. 1a, while each of sub-sets 24 and 26 includes instances of resource types R1 through R5, resource R5a may be much larger than resource R5b and therefore, as illustrated, zone PZ1d may be larger than zone PZ2d.

In some cases it is contemplated that, once a resource sub-set has been completely configured to perform an automated process, the process zone may be entirely eliminated for the specific sub-set. Here, when one process zone is eliminated, adjacent process zones may be expanded to facilitate positioning of resources in the other zones for providing information related thereto.

Generally, referring still to FIG. 1a, when a resource is located within facility 10 and its transmitter is turned on, controller 38, access points 11 and the resource transmitter cooperate to determine resource location within facility 10. Once resource location has been determined, controller 38 accesses the facility map (e.g., a map akin to the FIG. 1a schematic) in database 40 and determines if the resource is within one of the process zones corresponding to or associated with a specific automated process. If a resource is within a process specific zone, controller 38 accesses process information corresponding to the specific resource and associated zone and provides that information in whatever form is appropriate given the way in which the information is to be used. Thereafter the information is used to configure the resource and, perhaps, other resources in the process zone to perform an associated process.

Figure 2A:
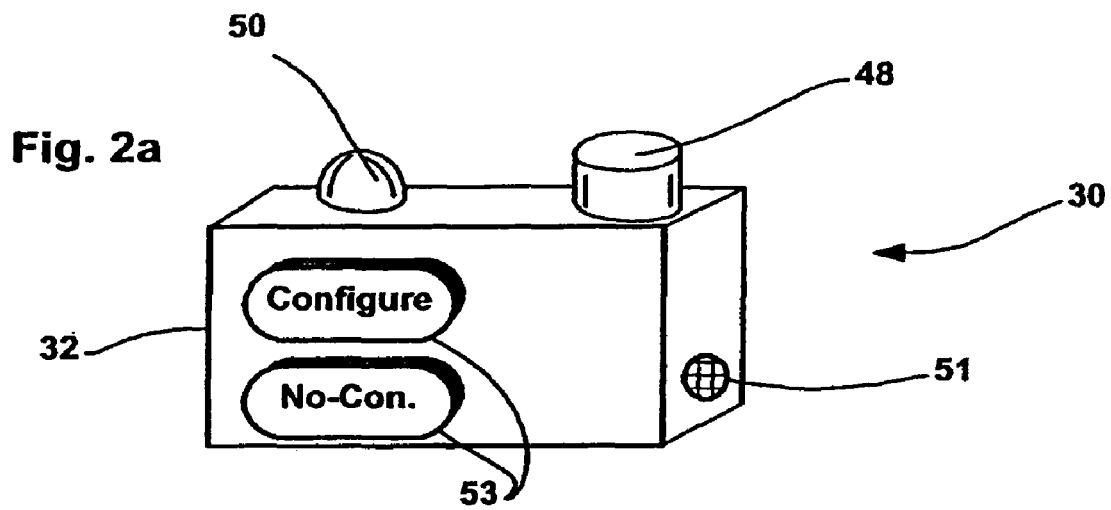
FIG. 2a is a perspective view of an exemplary wireless resource device (WRD) according to the present invention.
Figure 2B:
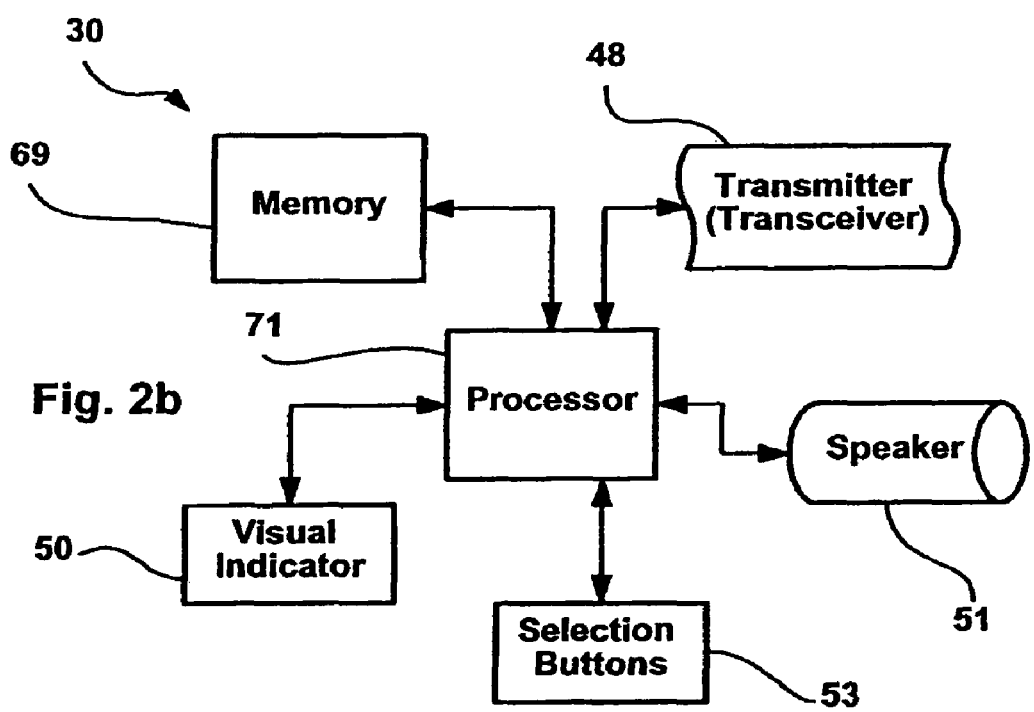

Referring now to FIGS. 2a and 2b, an exemplary wireless resource device (WRD) 30 is illustrated. WRD 30 includes, generally, a plurality of components that are mounted within a hardened plastic or metallic housing identified by numeral 32. Housing 32 is in turn mounted (e.g., bolted to, glued, etc.) to an associated resource (not illustrated in FIG. 2a). In at least one embodiment, WRD 30 components include a processor 71, a memory 69 and a transmitter 48. Processor 71 is linked to each of the transmitter 48 and memory 69. In at least some embodiments processor 71 is programmed to periodically transmit some type of resource identifier stored in memory 69 from transmitter 48 to controller 38 (see again FIG. 1a) via access points 11 which can be used to determine location of an associated resource.

In other embodiments, as illustrated in FIG. 2b, transmitter 48 may be replaced with a transceiver 48 that can both transmit information to access points 11 and receive information from access points 11. In this case, a location determining program may be stored in memory 69 and the system may be programmed so that controller 38 periodically transmits signals from access points 11 to WRD 30. The WRD processor 71 may run a location determining program using the signals received from the access points 11 to identify WRD location and hence the location of the machine associated with the WRD 30. WRD 30 may then be equipped to transmit its location back to controller 38 via access points 11.

As another alternative, in embodiments where facility process zones are pre-defined, a map of the pre-defined zones may be stored in WRD memory 69 so that WRD 30 can determine if WRD 30 is located within a process zone and, when WRD 30 is in a process zone, WRD may transmit a signal indicating the process zone to controller 38. Where process zones are not fixed and instead are altered by controller 38 (e.g., as a function of proximity of other facility processes), the step of determining if a WRD is in a process zone is, in some embodiments, performed by controller 38.

Referring still to FIG. 2b, where WRD 30 includes a transceiver 48, WRD 30 may also include one or both of an audio indicator 51 (e.g., a speaker) and a visual indicator 50 (e.g., an LED) linked to processor 71. Here it is contemplated that the indicators 50, 51 may be used to provide some indication to a facility operator when a resource including a WRD 30 is located within a process zone, when an automated configuration process is commenced, when a resource is in a suitable juxtaposition with respect to other resources with which the resource is to be configured, etc. For example, when a WID is located in a specific process zone, controller 38 may transmit a signal to WRD 30 causing processor 71 to issue a short beep via speaker 51 or to illuminate an LED 50 for a short time or both. Once alerted to location, a system operator can take whatever steps may be necessary to configure resource sub-sets. This feature can reduce the amount of zone hunting that may occur as an operator searches for process zones.

Figure 3:
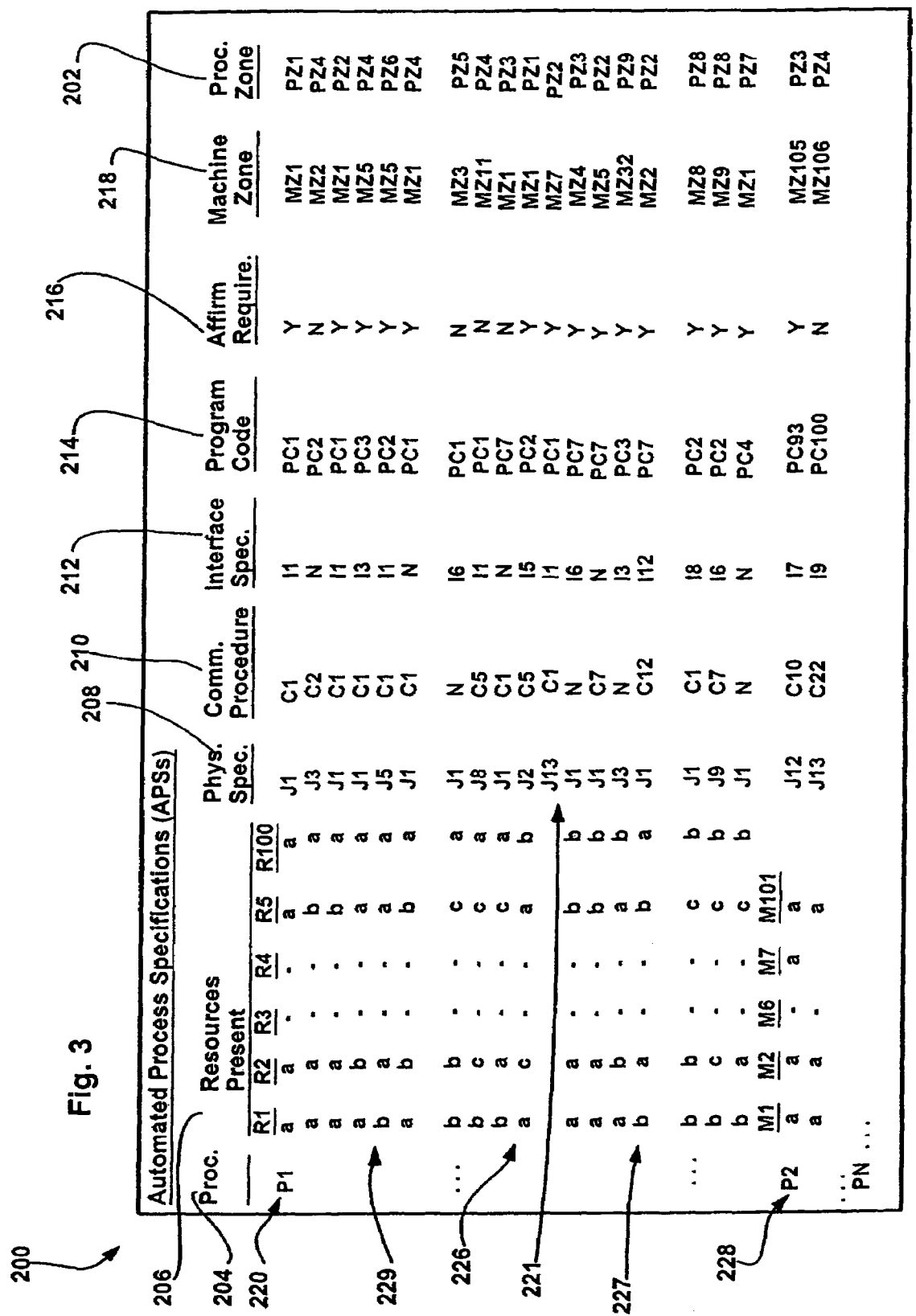
FIG. 3 is an automated process specification that may be used by the controller of FIG. 1a to perform various aspects of the present invention.

Referring now to FIG. 3, an exemplary automated process specification (APS) 200 that may be stored in database 40 (see again FIG. 1a) for use by controller 38 in designating process zones and identifying process information required to configure resource sub-sets to perform facility processes is illustrated. APS 200 includes several columns of information. It should be appreciated that many of the columns of information illustrated may be combined in a simplified APS and that the information has been broken out into columns to highlight various aspects of the present invention. For instance, program code in column 214 may include specification required to drive an interface and hence column 212 information may be folded into code column 214 in some embodiments. Similarly information in each of columns 210, 216, 218 and 202 may be combined with information in column 214 in some application.

Exemplary APS 200 includes information to support many different aspects of the present invention. Many of the inventive embodiments will only use a portion or sub-set of the information in APS 200 while other embodiments may use all of the information in APS 200. An APS may include information in addition to the information illustrated in exemplary 200 to support other information providing aspects of the invention that may not be described herein. Thus, it should be appreciated that APS 200 is not meant to be exhaustive. Exemplary APS 200 includes nine separate columns including a process column 204, a resources present column 206, a physical specification column 208, a commissioning procedure column 210, an interface specification column 212, a program code column 214, an affirmation required column 216, a machine zone column 218 and a process zone column 202.

Process column 204, as its label implies, includes a list of specific automated facility processes. For instance, process P1 may be a PCB manufacturing process for assembling a first type of PCB product, process P2 may be a PCB inspection process designed to identify product flaws and so on. Many other associated processes are contemplated and each would be listed in column 204.

Resources present column 206 includes separate sub-columns for each resource type required in a resource sub-set to perform an associated process in column 204. For example, referring also to FIG. 1a, to perform the first process P1 associated with resource sub-set 24, in the present example, it is assumed that instances of each of resource types R1, R2, R3, R4, R5 and R100 are required. Thus, the portion of resources present column 206 corresponding to associated process P1 in column 204 includes six separate resource type columns labeled R1, R2, R3, R4, R5 and R100.

The portion of resources present column 206 corresponding to each associated process in column 204 includes a matrix of all possible combinations of different instances of the resource types that may be combined to perform the associated process. For example, with respect to associated process P1, assuming that there are two different instances of resource type R1 including resources R1a and R1b that can be combined with instances of each of resources R2, R3, R4, R5 and R100 to perform process P1, the matrix in column 206 corresponding to associated process P1 in column 204 includes resource sub-sets that include resource instance R1a and resource instance R1b. Similar comments are applicable to each of resource types R2, R5, and R100 as it has been assumed that there is more than a single instance of each of those resource types that may be combined with other resources to perform associated process P1.

A "-" indicator in any of the resource columns indicates that there is only a single instance of that type of resource or that, from a controls perspective, there is no distinction between the instances of the specific resource type when used to perform the associated process. For example, the "-" in row 220 under resource type column R3 indicates that there is only one instance of resource R3 that may be used within facility 10 or that the characteristics of the instance of resource type R3 selected to configure the sub-set are irrelevant from a control perspective.

Thus, one sub-set of resources identified in column 206 that may perform the associated process P1 in column 204 and that corresponds to row 220 includes resources R1a, R2a, R3, R4, R5a and R100a. A second resource sub-set corresponding to sub-set 24 in FIG. 1a is identified by row 226 in resource present column 206 while a third resource sub-set corresponding to sub-set 26 in FIG. 1a is identified by row 227 in column 206.

Referring still to FIG. 3 and also again to FIG. 1a, the matrix in row 206 corresponding to the second process P2 includes only five resource type columns R1, R2, R6, R7 and R101 in resource present column 206 indicating that only five resources are required to perform associated process P2 in column 204. Many other machine combinations are contemplated and would be indicated in resources present column 206.

Physical specification column 208 includes one or more specifications of machine juxtapositions and/or input and output (I/O) linkage requirements for each of the sub-sets of resources specified in resources present column 206. For example, referring again to row 226, where resources R1a, R2c, R3, R4, R5a and R100b are within a process zone, column 208 indicates a specific machine juxtaposition J2 to configure the resources present to perform associated process P1 in column 204. Similarly, column 208 indicates juxtaposition J1 when the resource sub-set corresponding to row 227 is within a zone associated with process P1.

Juxtaposition may simply correspond to a specific order of resources that operate in a sequential fashion or, in the alternative, may include clustering of resources in specific configurations required to perform associated processes. Although not separately indicated in column 208, column 208 may also include complete I/O specifications indicating how different resources in the resource sub-sets identified in column 206 are to be linked to a controller backplane, to each other etc., to provide required communication between the controller (e.g., 38 in FIG. 1a) and each of the sub-set resources.

The physical specifications 208 may be provided in any of several different ways. In at least one embodiment of the invention, where at least one of the sub-set resources includes an interface (see R4 in FIG. 1a), the physical specification may include an actual schematic image similar to the resource schematics illustrated in FIG. 1a that spatially identifies where sub-set resources should be located with respect to each other. Similarly, the I/O specification in column 208 may visually indicate how different resource input and output ports are to be linked to backplane input and output ports. In the alternative, I/O specification may simply provide a listing of required I/O linkages, a tool with which most automated facility operators should be familiar.

In some embodiments of the invention controller 38, in conjunction with other system components, will be able to confirm juxtaposition and I/O linkages after an operator attempts to comply with the specifications provided pursuant to column 208. Where the controller 38 is capable of confirming juxtaposition and I/O linkages and those specifications have not been suitably met, in at least some embodiments of the invention it is contemplated that controller 38 will provide some type of feedback to a system operator to indicate that resource position and/or I/O linkage requirements have not been achieved.

Figure 1B:
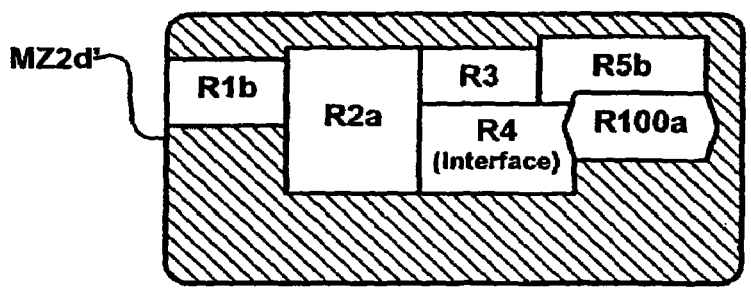
FIG. 1b is a schematic diagram illustrating a sub-set of automated resources and a related machine zone.
Figure 1C:
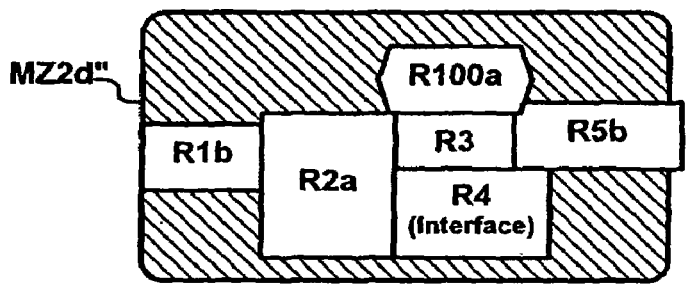
FIG. 1c is similar to FIG. 1b, albeit illustrating a second arrangement of resources and a corresponding machine zone.

Referring still to column 208 of FIG. 3, in some embodiments of the invention, for at least some of the resource sub-sets listed in column 206, physical specification column 208 may list two or more specifications that are suitable for the specific sub-set to perform the associated process in column 204. For instance, for the resource sub-set corresponding to row 226 and including resources R1a, R2c, R3, R4, R5a and R100a, column 208 includes two different physical specifications including specification J2 and specification J13 (see 221). Referring to FIG. 1b, second resource sub-set 26 in FIG. 1a is illustrated with resource R100b in a first juxtaposition with respect to the other sub-set resources. The juxtaposition of FIG. 1b should be contrasted with the juxtaposition of FIG. 1c where resource R100a is in a second relative position with respect to the other sub-set resources. Among other things, FIGS. 1b and 1c are illustrative of multiple suitable juxtapositions for a single resource sub-set.

Where multiple juxtapositions are suitable, it is contemplated that, in at least some embodiments of the invention, controller 38 will provide a choice of resource juxtapositions to a system operator and allow the operator to select which of the juxtapositions is appropriate. In this regard, it may be that an operator has access to information which renders one of a plurality of resource juxtapositions more suitable than other possible juxtapositions. For example, a system operator may know that a second machine line will be constructed adjacent a first machine line in the near future and may also know that one of the possible juxtaposition options is better than the other option given the likely location of the second machine line.

As well known in automated controls, often, when a group of resources are combined to perform an automated process, a commissioning procedure may have to be performed to either provide specific information to a system controller (e.g., 38 in FIG. 1a) required to run the process or to test the process to make sure that the resources are suitably sequenced and controlled to provide the desired end result. In this regard, the commissioning procedure typically depends upon the types of resources that are combined to perform the process including the types of sensors and actuators used, the sequences performed, the relative juxtapositions of the resources and so on.

Referring again to FIG. 3 and, more specifically to column 210, commissioning procedures column 210, as its label implies, includes, for at least some of the process/sub-set physical specification combinations in column 204, 206, and 208, a separate commissioning procedure. Thus, commissioning procedure C1 corresponds to the process/sub-set/physical specification combination in row 220, commissioning procedure C5 corresponds to the combination in row 226, and so on. An "N" indicator in column 210 indicates that there is no commissioning procedure required for an associated process/sub-set/physical specification combination.

Exemplary commissioning procedures may require a system operator to input specific rated operating characteristics of the resource sub-sets in column 206, may require performance of actual resource sequences to derive operating characteristics, may require specific resource sequences that have been selected as being representative of whether or not a resource or group of resources are operating properly, may require entry of information related to characteristics of raw materials employed by sub-set resources, etc. As in the case of the physical specifications, the commissioning procedures in column 210 may include interaction with the system operator via some type of resource interface and here, it is contemplated that procedure 210 specifies how to interface with the operator (e.g., provides an interface type specification for carrying out the commissioning procedure).

During machine operations, often it is advantageous to allow a system operator to interact in some fashion with the machines that are performing the process. In this regard, the machine operator may wish to alter resource operations or, in the alternative may wish to simply monitor resource operation as a process is being performed by observing resource operating characteristics via an interface or the like.

Referring once again to FIG. 3 and specifically to column 212, interface specification column 212 includes a separate interface specification for each of the process/sub-set/physical specification combinations in columns 204, 206 and 208. Thus, for instance, interface specification I1 corresponds to the combination associated with row 220, interface specification 15 corresponds to the combination of row 226, and so on.

The programs run by controller 38 to perform a facility process will depend on the sub-set of resources combined to perform the specific process. For example, referring again to FIG. 1a, while the same process P1 is performed by each of resource sub-sets 24 and 26, because different instances of resource type R1 (i.e., R1a and R1b) are included in each of the resource sub-sets 24 and 26, respectively, the programs run by controller 38 to perform each of the processes may be different.

Referring still to FIG. 3, program code column 214 includes a separate controller program for each one of the process/sub-set/physical specification combinations in columns 204, 206 and 208. For example, a program PC1 in column 214 corresponds to the row 220 combination, program PC2 corresponds to the row 226 combination and program PC7 corresponds to the row 227 combination. Many different programs are contemplated.

As indicated above, in some cases, instead of automatically using information to configure a sub-set of resources to perform a process, controller 38 may provide a system operator with the option to configure a resource sub-set to avoid unintended automatic configuration. Referring to FIG. 3, column 216 includes indicators that can be used to identify when operator affirmation is required prior to resource configuration. In column 216 a "Y" indicator indicates that operator affirmation prior to automatic configuration is required whereas an "N" indicator indicates that affirmation is not required. Thus, for example, referring again to row 220, when each of resources R1a, R2a, R3, R4, R5a and R100a is present within a zone associated with process P1 and, assuming controller 38 performs at least some automatic programming or configuration of the sub-set of resources in column 206 when those resources are present, the "Y" indicator in column 216 indicates that controller 38 will require the system operator to affirm that the automated portion of the configuring process be performed. Confirmation that a process should be performed can be supported in any of several different ways including, but not limited to, providing an indication that confirmation is required via a system interface.

In some cases the present invention may be used with a portable wireless information device (WID) that may be used by a system operator to obtain process information as described above, to perform commissioning procedures, to receive physical resource specifications, to provide configuration affirmation and to perform any other type of configuration interfacing process required. In addition, it is contemplated that a WID may also be used during resource operation to either monitor resource operating parameters and/or to control resource operations in a wireless fashion.

When either accessing resource information or controlling resource operation, it is contemplated that in at least some embodiments of the invention the information access and resource control capabilities should be restricted to zones that are proximate the resources being monitored or controlled. For example, referring once again to FIG. 1a, a first machine zone MZ1d corresponding to resource R5a is illustrated and includes the space adjacent one end of resource R5a. Similarly, a second machine zone MZ2d corresponding to the entire resource sub-set 26 is illustrated which includes space that essentially surrounds all of the resources in sub-set 26. A third illustrated machine zone MZ3d includes a space around machine sub-set 28. When a WID is located within machine zone MZ1d, it is contemplated that the WID operator is able access information corresponding to resource R5a or control resource R5a. Similarly, when a WID is located within machine zone MZ2d, it is contemplated that a WID operator is able to either access information from or control any of the resources in sub-set 26 and so on.

In at least some embodiments of the invention it is contemplated that some automated processes may be able to be performed by less than an optimal number of resources. For example, referring once again to FIG. 1a, it may be that first process P1 can be performed without any instance of resource type R100 or, in a more optimal fashion, with an instance of resource R100. In this case, the machine zone corresponding to the less optimal resource sub-set including resources R1b, R2a, R3, R4 and R5b may be different than the machine zone corresponding to the sub-set that includes an instance of resource R100a. Referring also to FIG. 1b, a modified machine zone MZ2d' is illustrated that is associated with the optimal resource sub-set including resource R100a where modified zone MZ2d' is different than the initial zone MZ2d (see again FIG. 1a).

In addition, referring again to FIG. 3, where more than one physical specification corresponds to each resource sub-set in column 206, there may be different machine zones corresponding to each of the different juxtapositions. In this regard, comparing FIGS. 1b and 1c, where resources R100a is located in different juxtapositions with respect to the other sub-set resources, the machine zones MZ2d' and MZ2d", respectively, are different.

Figure 1D:
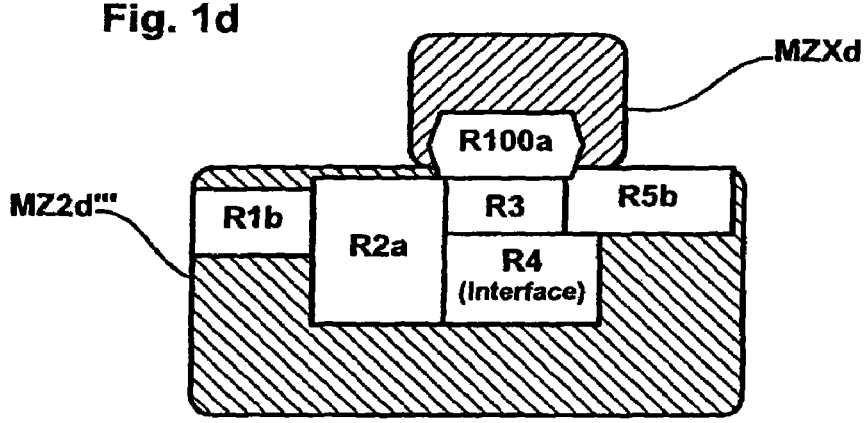
FIG. 1d is similar to FIG. 1b, albeit illustrating a third arrangement of resources and a related machine zone.

Moreover, when a resource is added to an existing sub-set of resources, it may be appropriate to provide a separate machine zone for the added resource and may also be appropriate to alter the existing machine zones corresponding to the initial sub-set of resources. In this regard, referring to FIG. 1d, in at least some embodiments, when a resource R100a is added to an existing sub-set, the machine zone MZ2d may be altered to provide a modified machine zone MZ2d''' and an additional machine zone MZXd corresponding to the added resource R100a may be provided adjacent resource R100a. In the figures a "d" qualifier after a machine zone label indicates a designated machine zone tied to a specific facility location.

Referring still to FIG. 3, as its label implies, machine zone column 218 includes a separate machine zone specification corresponding to each of the process/sub-set/physical specification combinations identified in columns 204, 206 and 208. For instance, machine zone specification MZ1 corresponds to the combination associated with row 220 while machine zone specification MZ4 corresponds to the combination in row 226 and so on. Here, the machine zone specifications include algorithms that can be used to identify machine zones required for specific process/sub-set/physical specification combinations in columns 204, 206 and 208. Thus, referring once again to FIG. 1a, where resource sub-set 24 is configured relative to facility walls 12 as illustrated, machine zone MZ1d may be specified as illustrated. However, if resource sub-set 24 were configured near the bottom of facility 10 as illustrated (i.e., in the space occupied by resource sub-set 28 as illustrated), the machine zone MZ1d would be specified in a different location near the bottom of facility 10 as illustrated but in the same relative juxtaposition with respect to the resources in resource sub-set 24. As another instance, referring again to FIGS. 1c and 1d, where a system user is provided with two different possible physical specifications for combining mobile resource R100a, the machine zones MZ2d" or MZ2d'" and MZXd may be identified via the corresponding machine zone specification. While only simple machine zone algorithms are described here it should be recognized that other far more complex algorithms are contemplated that may alter machine zone sizes, shapes and relative juxtapositions as a function of various factors including but not limited to the number of resources combined to perform a process, resources types, relative juxtapositions, control and monitoring capabilities, etc.

Referring still to FIG. 3, process zone column 202, as its label implies, indicates process zones associated with each process/sub-set/physical specification combination in columns 204, 206 and 208. For instance, when the process/sub-set/physical specification combination of row 226 occurs, process zone PZ1 is identified in column 202, when the combination of row 227 occurs process zone PZ2 is identified in column 202 and so on. Unlike the zones earmarked in FIG. 1a, zones in column 202 do not include a "d" qualifier. This is because the zones in column 202 simply define zone boundaries relative to process and/or resource sub-sets that have not yet been "tied" to a specific facility location. Hereinafter, to distinguish column 202 process zones from designated zones (i.e., zones ties to specific facility locations), column 202 process zones will be referred to as generic process zones.

In some embodiments it is contemplated that controller 38 runs a process zone algorithm to identify suitable process zones given whatever zone related criteria have already been specified or is already available. For instance, referring again to FIG. 3, assume that initially only resource R1b is associated with first process P1. Here the optimal generic process zone for use with the full compliment of resources that will eventually comprise the resource sub-set combination assembled to perform process P1 will not be determinable because which instances of resource types R2, R5 and R100 will be included in the sub-set cannot be ascertained. In this case, controller 38 may be programmed to simply select the first generic process zone in column 202 that is associated with the resources currently present. In the present example, controller 38 selects process zone PZ6 (see row 229). Once process zone PZ6 is identified, controller 38 designates a zone PZ6d (not illustrated) about resource R1b for use in identifying additional resources to combine to perform process P1.

As other required resources are brought into the process zone, zone PZ6d may be replaced with a more suitable zone. For instance, where a resource R5b is next brought into zone PZ6d, controller 38 may select the zone in column 202 associated with the first resource sub-set in column 206 that includes each of resources R1b and R5b (i.e., zone PZ2 corresponding to row 227) and may then designate new zone PZ2d (see FIG. 1a). Thus, the zone refining process would continue until all required resources are present. Eventually, as additional resources are added to round out the required sub-set, controller 38 alters the process zone accordingly.

Other relatively simple process zone specifications may be employed in some inventive embodiments. For instance, a single size process zone may be specified for all resource sub-sets or two or three different process zone sizes may be specified to generally accommodate differently configured resource sub-sets.

Referring yet again to FIG. 3, where more than one physical specification is identified in column 208 for a process/sub-set combination in columns 204 and 206, it is contemplated that each of columns 210, 212, 214, 216, 218 and 220 may also include different information for each physical specification. For instance, rows 226 and 221 include different information for each of physical specifications J2 and J13.

B. Exemplary Methods

Hereinafter, unless indicated otherwise, the invention will be described in the context of an exercise to configure the resource sub-set 26 in FIG. 1a to perform process P1. In addition, it will be assumed that some of the resource sub-sets in facility 10 have already been configured and are performing their associated processes. Processes being performed will be referred to as "enabled processes" while processes for which additional resources are required will be referred to as "non-enabled processes."

Figure 4:
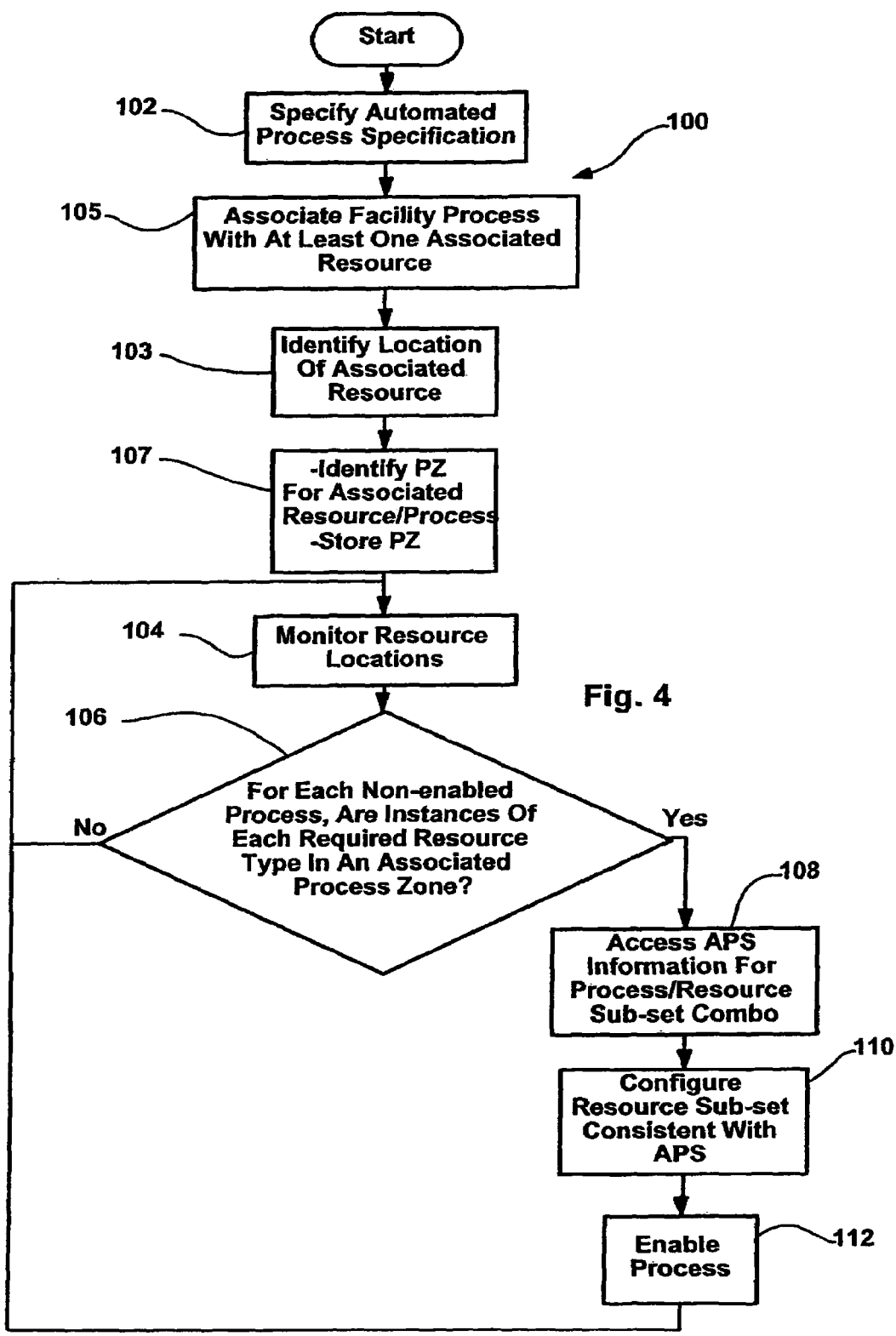
FIG. 4 is a flow chart illustrating one method according to the present invention.

Referring now to FIG. 4, one method 100 for facilitating resource configuration to perform a process is illustrated. Referring also to FIGS. 1a, 2a, 2b and 3, at process block 102, an APS like APS 200 illustrated in FIG. 3 is specified and stored in database 40 for access by controller 38.

At block 105 at least one of the sub-set 26 resources is associated with process P1. For example, a system operator may plug interface R4 into a backplane input port linked to controller 38 via bus 34 and indicate via the interface that the operator wishes to configure a sub-set of resources to perform process P1. At block 103 controller 38 determines the location of the resource associated with process P1.

At block 107, controller 38 uses the process zone specification in column 202 to identify a process zone for process P1 that is positioned as a function of the location of the associated resource. As indicated above, where less than all required resources for performing an associated process are present, controller 38 may select as a default process zone the first generic process zone in column 202 that is consistent with the instances of the resources present. Thus, where only interface R4 is present controller 38 selects process zone PZ1 (see row 220 in FIG. 3). Where instances R1b, R2a and R5b are present (e.g., row 227), controller 38 selects process zone PZ2. Other algorithms for selecting default intermediate process zones are contemplated. Once a generic process zone has been selected controller 38 designates boundaries of the zone as a function of the location of the associated resource. Hereinafter it will be assumed that process zone PZ2d in FIG. 1a has been designated.

Next, at block 104, with a plurality of resources inside facility 10, controller 38 monitors resource locations. At block 106 controller 38 determines, for each non-enabled process, whether or not there are instances of each required resource type in an associated process zone. In this regard, referring again to FIG. 3, for example, assuming process P1 associated with zone PZ2d has not yet been enabled, at block 106 controller 38 determines whether or not at least one instance of each of resources R1, R23, R3, R4, R5 and R100 is located within zone PZ2d. Where one or more of the required resource types is not located within zone PZ2d, control passes back up to block 104 where controller 38 continues to monitor resource locations. Where at least one instance of each of resources R1-R5 and R100 is located within zone PZ2d, control passes from block 106 to block 108. At block 108, controller 38 accesses APS 200 for the resource sub-set present within zone PZ2d. Thus, for example, assuming that the resources corresponding to row 227 (i.e., resources R1b, R2a, R3, R4, R5b and R100a) are present in zone PZ2d controller 38 access associated information in columns 208, 210, 212, 214, 216 and/or 218 of APS 200 at block 108.

It should be noted that the condition of block 106 likely would not be required in most embodiments of the invention and instead, as resources required to perform a process are brought into a process zone associated with the process, the controller 38 would provide information useable to configure the additional resource. This aspect of the invention is more consistent with typical configuration procedures where resources are brought to the configuration location and configured in small sets. Nevertheless, the fiction represented by decision block 106 is used here to simplify the present explanation.

Continuing, at block 110 in FIG. 4, after accessing APS information and providing that information, the resource sub-set in zone PZ2d is configured. As indicated above, configuration may be manual, automatic or may include both manual and automatic aspects. In any case, the configuration process at block 110 includes configuring the sub-set of resources within zone PZ2d in a manner consistent with the APS process information. After the resources have been appropriately configured to perform the associated process, control passes to block 112 where the process is enabled prior to control passing back up to block 104 where the cycle is repeated.

The loop corresponding to blocks 106, 108, 110 and 112 is routinely performed for each non-enabled process within facility 10. Thus, for example, in FIG. 3, the FIG. 4 process is repeated for associated process P1 in each of process zones PZ1d and PZ2d in a parallel fashion while the loop is performed for process P2 in zone PZ3d (see row 228) and so on. Hence, the loop including blocks 106, 108, 110 and 112 may be at different stages of completion for each of the associated processes in column 204 of FIG. 3 at any given time.

Referring now to FIG. 5, consistent with the description above, one exemplary way to monitor resource location includes, where each resource includes a WRD 30, transmitting resource identifier signals at a specific and known signal strength to access points 11 proximate the WRD's at block 96. When an access point 11 receives a transmitted signal, the access point 11 identifies the signal strength and the WRD and packages those two bits of information along with an access point identifier and transmits this information packet via data bus 36 to controller 38. At block 98, controller 38 uses signal strengths and the access point identifiers to determine the location of the specific WRD and associated resource within facility 10.

Any of several different methods to determine WRD location using signal strength may be used. For instance, a signal triangulation method whereby the intersection of three access point signal strength circles is used to determine location may be employed. Other statistical methods of locating are also contemplated including those described in WO 02/054813 which in incorporated herein by reference for its teachings regarding location based algorithms. At block 98, after WRD 30 location has been precisely identified, controller 38 accesses the facility map in database 40 and determines in which, if any, machine zone the WRD 30 is located.

Referring now to FIG. 6, a sub-process for providing a system operator the opportunity to initiate a resource configuring procedure when required by column 216 in APS 200 is illustrated. Referring also to FIG. 4, after block 106, when at least one instance of each resource required to perform a process in column 204 is located within a process zone corresponding thereto in column 202, control passes from block 106 to block 114. At block 114, controller 38 determines whether or not process affirmation is required. In this regard, controller 38 accesses APS 200 and identifies the indicator in column 216 corresponding to the process/sub-set combination in columns 204 and 206. Where process affirmation is not required, control simply passes back to block 108 in FIG. 4 and the machine sub-set is configured in a manner consistent with the APS information in columns 208, 210, 212, 214, 218 and 200.

In the present example, process affirmation is required in column 216 when the process/sub-set/juxtaposition specification corresponding to row 227 occurs and hence, from block 114, control passes to block 116 where a query is provided to the system operator requiring an affirmative indication that the configuration process should begin. Here, where one of the resources includes an interface (e.g., R4) a simple screen shot provided via the interface may indicate to the operator that all of the resources required to perform the associated process in column 204 are within process zone PZ2d and request that the operator either select a "configure" icon or a "no configure" icon. The icons may be selectable via a mouse controlled cursor, a touch screen, or in any other manner known in the computing arts.

WRDs may be provided with some type of input devices to facilitate at least some minimal interfacing capabilities. For instance, referring again to FIGS. 2a and 2b, rudimentary selection buttons 53 may be provided on each WRD 30 for opting to configure or not configure resources to perform an associated process. Buttons 53 are linked to processor 71 which transmits a selected option to controller 38.

If one of the machines required to perform the process is removed from the process zone PZ2d, this may be taken as an affirmative request not to perform configuration. In any event, at block 118, if configuration is affirmed, control passes back to block 108 in FIG. 4. If affirmation is not provided, control passes back up to block 104 in FIG. 4 where machine locations are again monitored.

Figure 7:
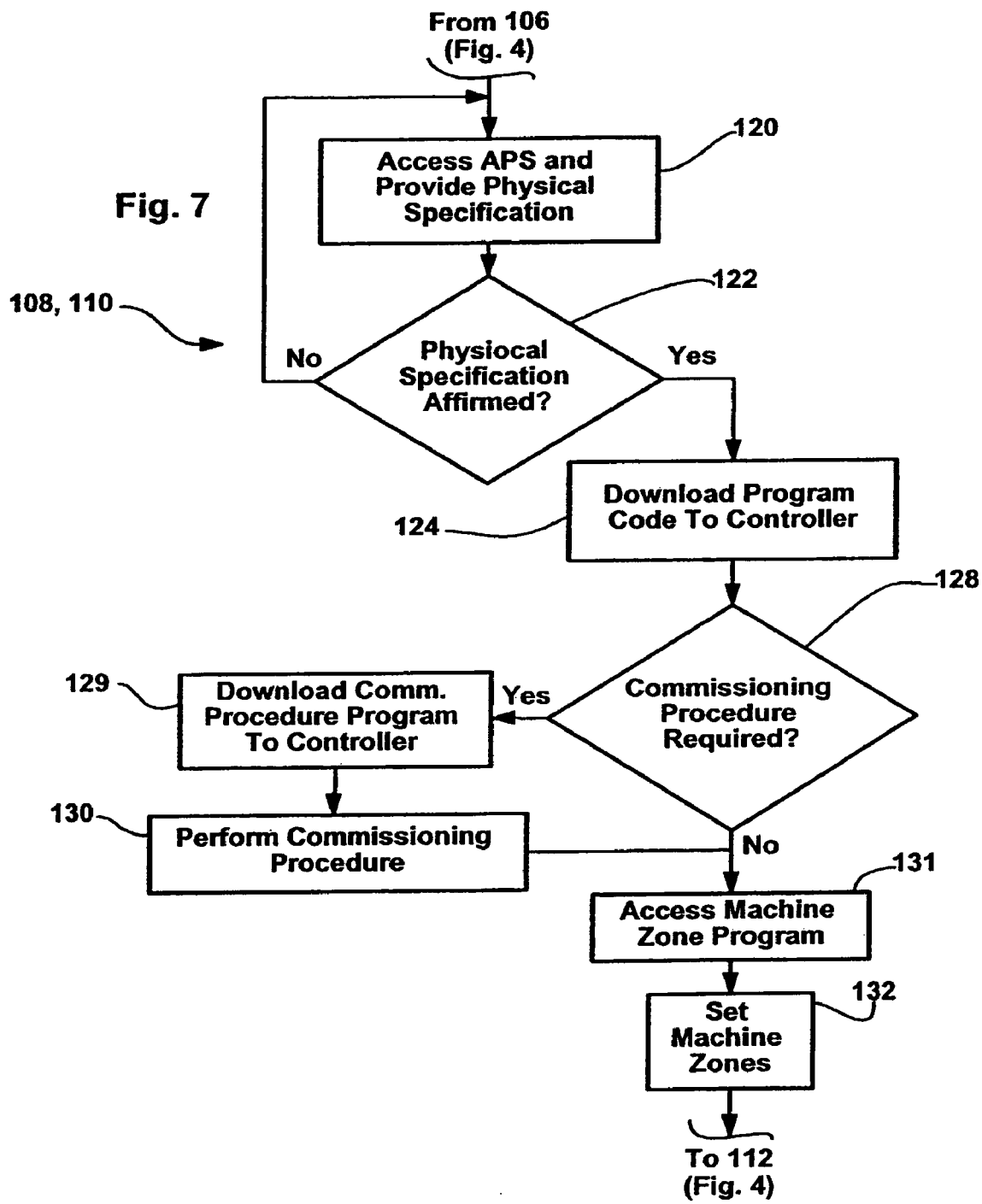
FIG. 7 is a flow chart illustrating one other sub-process that may be included in the process of FIG. 4.

Referring now to FIG. 7, an exemplary configuration sub-process which may comprise blocks 108 and 110 in FIG. 4 is illustrated. To this end, referring also to FIG. 1a, it will be assumed that initially resources R1b, R2a, R3, R4 and R5b are all present within second process zone PZ2d and have not yet been configured to perform process P1. Consistent with the above description it will also be assumed that resource R4 is an interface for providing information to and receiving information from an operator. Moreover, it will be assumed that mobile resource R100a is brought into process zone PZ2d.

Referring now to FIG. 4 and also to FIG. 7, at block 106 in FIG. 4, after controller 38 determines that instances of each required resource type R1 through R5 and R100 are within process zone PZ2d as required by APS 200, control passes to block 120 in FIG. 7. At block 120, controller 38 accesses APS 200 to identify the physical specification in column 208 corresponding to the sub-set of resources including resources R1b R2a, R3, R4, R5b and R100a and indicates both the juxtaposition and I/O mapping requirements. Here, interface R4 is used to provide the juxtaposition and I/O requirements.

Figure 8:
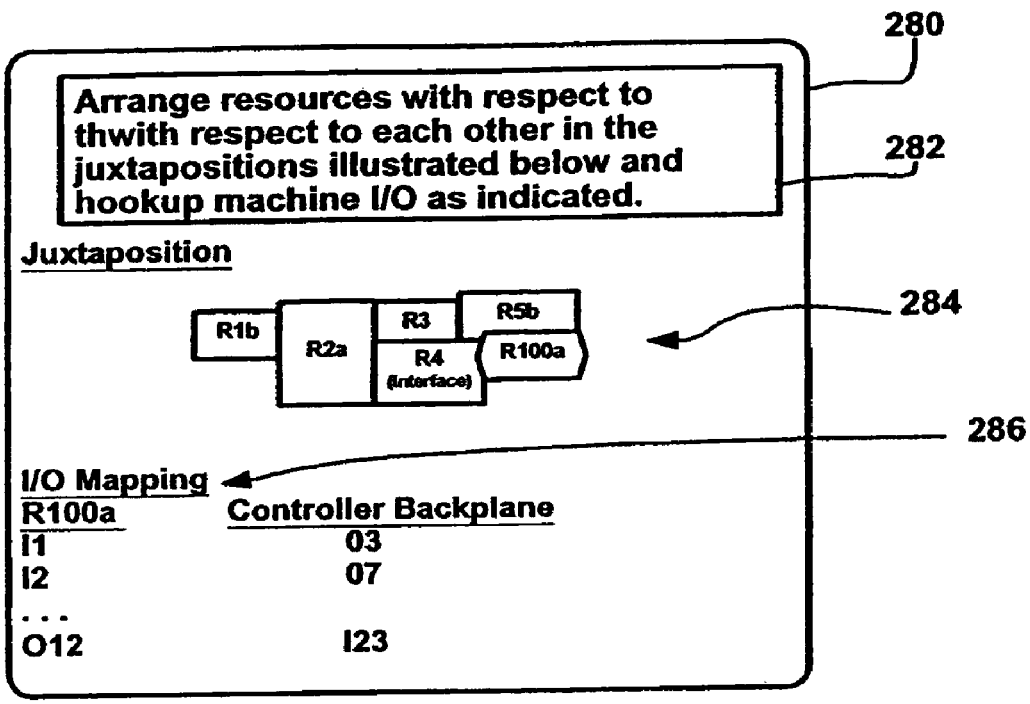
FIG. 8 is an exemplary screen shot according to one aspect of the present invention.

Referring also to FIG. 8, an exemplary screen shot 280 for providing juxtaposition and I/O mapping information is illustrated which includes an instruction box 282, a juxtaposition map 284 and an I/O mapping table 286. Instruction box 282 generally instructs a system operator to arrange the resource sub-set as illustrated in the juxtaposition map 284 and to hook up the resources as indicated by the I/O mapping information presented in table 286. In this example, it is assumed that controller 38 and access points 11 can determine when the resource sub-set is in the required juxtaposition and hence when the juxtaposition criteria has been met. In addition, because controller 38 is directly linked to the back plane to which each of the resources in the sub-set is connected via I/O linkages, it is also assumed that controller 38 can determine when a particular resource has been linked to a particular input or output of the back plane and hence when the I/O mapping criteria has been met.

At block 122, controller 38 determines whether or not the juxtaposition and I/O criteria have been met. When the criteria have not been met, control passes from block 122 to back up the block 120 and screen shot 280 is continually providing via interface R4. Once the juxtaposition and I/O criteria have been met at block 122, the control passes to block 124. At block 124, controller 38 downloads the program code in column 214 of APS 200 that corresponds to the process/sub-set/physical specification combination in columns 204, 206 and 208. In the present example, the program code corresponding to the combination associated with row 227 includes PC7.

After block 124 control passes to block 128 where controller 38 accesses APS commissioning procedure column 210 to determine whether or not a commissioning procedure is required prior to enabling the resource sub-set in column 206 to perform the automated process P1. Where a commissioning procedure is not required, control passes to block 131 where machine zones for the machine sub-set 26 and/or the separate machines in the sub-set are identified.

Figure 9:
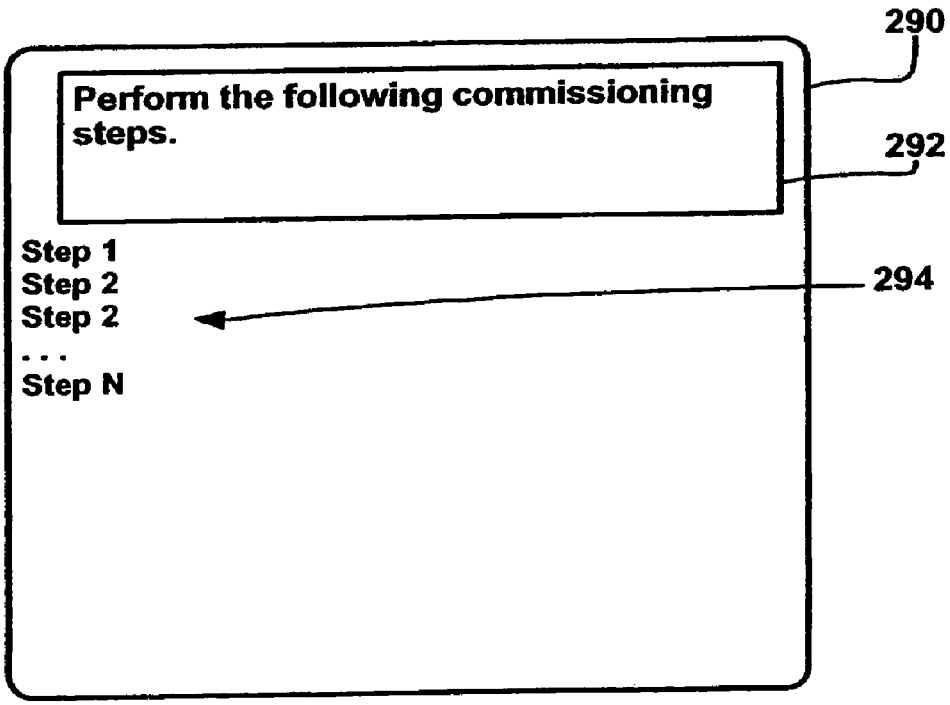
FIG. 9 is similar to FIG. 8, albeit illustrating another aspect of the present invention.

Referring again to block 128, where controller 38 determines that a commissioning procedure is required, control passes to block 126 where the required commissioning procedure is downloaded to controller 38. In the present example, column 210 indicates that commissioning procedure C12 must be performed when the process/sub-set/physical specification combination of row 227 occurs and hence, commissioning procedure C12 is downloaded to controller 38 at block 126. Controller 38 performs the commissioning procedure C12 at block 130. Where the commissioning procedure requires some interaction (e.g., entry of rated values associated with resources, etc.) with a system operator, the commissioning procedure may include instructions to guide the operator through the manual process steps. Referring to FIG. 9, an exemplary commissioning procedure screen shot 290 is illustrated that controller 38 may provide via interface R4 pursuant to a commissioning specification. Shot 240 includes an instruction box 292 and a series of manual commissioning steps 294.

After block 130 control passes to block 131 where suitable machine zones for monitoring and control are identified. After machines zones have been identified, the zones are used at block 132 to generate or designate a machine zone map that is stored in database 40 for subsequent use by controller 38. From block 132 control passes back to block 112 in FIG. 4.

In at least some embodiments of the invention it is contemplated that, when an interface resource is provided within a process zone, controller 38 may operate in conjunction with interface R4 to provide guidance to a system operator in obtaining instances of resources required to perform associated processing. A sub-process which may be added to the process of FIG. 4 between blocks 106 and 104 to help a system operator obtain required resources is illustrated in FIG. 10. Referring also to FIG. 4, after block 106, if one or more required resource types are not represented within a process zone, control passes from block 106 to block 134 in FIG. 10. For instance, referring again to FIG. 1a, where each of resources R1b, R2a, R3, R4 and R5b are located within process zone PZ2d and no instance of resource type R100 is within zone PZ2d, control passes from block 106 to block 134. At block 134, controller 38 identifies the required resource type that is not located within the associated zone. In the present example, controller 38 identifies resource type R100. At block 136, controller indicates the required resource type not present within the zone to the system user via interface R4. In the present example, controller 38 indicates resource type R100 via interface R4. After block 136 control again passes to block 104 in FIG. 4.

In at least some embodiments of the invention, controller 38 may provide warnings when a sub-set of resources are not in a required juxtaposition for performing a specific automated process. An exemplary sub-process that may comprise block 122 in FIG. 7 for identifying incorrect resource juxtaposition and providing a warning to a system operator is illustrated in FIG. 11. Referring to also to FIG. 7, after controller 38 accesses the APS 200 for a particular process/sub-set combination and identifies a required resource juxtaposition at block 120, control passes to block 138 in FIG. 11. At block 138, controller 38 determines whether or not the sub-set of resources is juxtaposed in the configuration required by APS 200. Where juxtaposition is correct control passes to block 124 in FIG. 7 where further configuration steps (e.g., downloading program code, downloading a commissioning procedure, identifying machine zones, etc.) are performed by controller 38. Where resource juxtaposition is not correct at block 138, control passes to block 140 where incorrect juxtaposition is indicated.

Any of several different ways to indicate incorrect juxtaposition are contemplated. For instance, referring once again to FIG. 8, where a juxtaposition map 284 is provided via interface R4, all correctly juxtaposed resources may be provided in a first color while other resources which are incorrectly juxtaposed may be highlighted in a second color different from the first color. After block 140, control passes back to block 104 in FIG. 4 where resource locations are continually monitored until, eventually, the resources are correctly juxtaposed.

As described briefly above, in at least some embodiments of the present invention, it is contemplated that, for at least some processes performed within a facility, the processes may be performed by groups of resources including less than a full compliment of resources that can optimally perform the process. For example, referring again to FIG. 1a, the process P1 performed by the resources that comprise sub-set 26 may be able to be performed by resources R1b, R2a, R3, R4 and R5b in a less than optimal fashion or, in the alternative, may be performable in an optimal fashion by resources R1b, R2a, M2, R4, R5b and additional resource R100a (or any instance of resource type R100). In this case, the present invention contemplates a process whereby, when optimal processing can be performed by adding an additional resource to an already operating sub-set of resources, controller 38 initiates a reconfiguration of resources when the additional resource is brought into a process zone associated with the less than optimal set of resources.

Referring now to FIG. 12, a second APS 250 is illustrated which includes information arranged to support a process which may be performed by less than an optimal set of resources. APS 250 is similar to APS 200 in FIG. 3 in that APS 250 includes each of a process column 254, a resources present column 256, a physical specification column 258, a commissioning procedure column 260, an interface specification column 262, a program code column 264, an affirmation requirement column 266, a machine zone column 268 and a process zone column 250. Differences between APS 250 and APS 200 are generally two fold. First, APS 250 indicates, for at least some process/sub-set combinations in columns 254 and 256, that one or more of the resources are optional while other resources are required. For instance, in FIG. 12 an "r" qualifier following a resource column heading (e.g., R1r, R2r, etc.) indicates that an instance of the particular resource type is required to perform the associated process. Where no "r" qualifier is provided (e.g., R100), the resource type is optional. Thus, for instance, in the case of row 229 each of resource instances R1b, R2a, R3, R4 and R5b are required while instance R100a is optional.

Figure 1E:
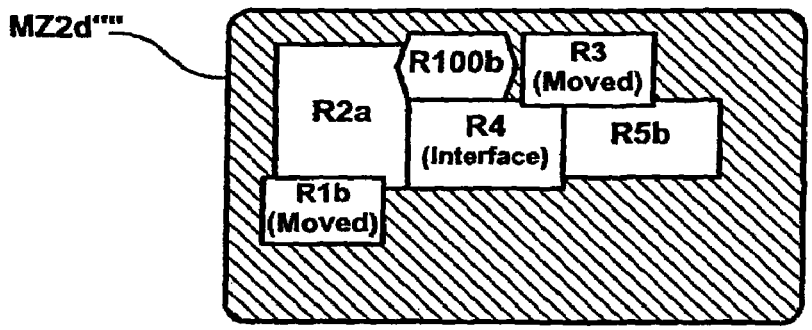
FIG. 1e is similar to FIG. 1b, albeit illustrating a fourth resource sub-set arrangement and corresponding machine zone.

Second, each of columns 258, 260, 262, 264, 268 and 252 includes two separate columns of specifications, one column labeled "r" corresponding to the required resources in column 256 and the other column labeled "o" corresponding to the resource set including the required and optional resources. Thus, for instance, referring again to FIGS. 1a and 12, where resources R1b, R2a, R3, R4 and R5b are present within a zone PZ2d associated with process P1 and resources R100a is not present, physical specification J8 may be appropriate. However, where resource R100a is brought into zone PZ2d, a different physical specification J1 may be required. FIG. 1e illustrates one exemplary different physical specification where each of resources R1b and R3 have to be moved to accommodate resource R100a. Similarly, when resource R100a is added to the less than optimal sub-set the commissioning procedure, interface specification, program code, machine zone and process zone may all be different as indicated in APS 250.

Other resource options and ways to specify those options are contemplated. For instance, more than one resource type may be optional in each or a subs-set of the resource sub-sets or, one resource type may be optional given a first sub-set of other resources but may be required given a second sub-set of other resources.

APS 250 is used in a manner similar to the manner described above with respect to APS 200 in FIG. 3 with slight modifications. To this end, referring also to FIG. 13, a sub-process which may be added to the process of FIG. 4 to automatically reconfigure a resource sub-set to accommodate an additional resource being added to optimize the process is illustrated. Referring also to FIG. 4, after block 104, control passes to block 150 in FIG. 13 where controller 38 accesses APS information for each enabled process. At block 152 controller 38 determines, for each enabled process, whether or not there is at least one instance of an optional non-configured resource type in an associated process zone. Where there is no instance of an optional non-configured resource type within a zone associated with an enabled process, control passes from block 152 back to block 106 in FIG. 4 where the bottom portion of process 100 in FIG. 4 is performed.

At block 152, where at least one optional non-configured resource type is within a process zone associated with an enabled process, control passes from block 152 to block 154. For instance, referring once again to FIG. 1a, assuming resources R1b, R2a, R3, R4 and R5b are initially configured and enabled and are operating to perform associated process P1, when resource R100a is brought into process zone PZ2d, consistent with row 229 in APS 250, controller 38 identifies resource R100a as one instance of an optional non-configured machine type and control passes to block 154.

At block 154, controller 38 accesses APS information for the associated process and machine set present within process zone PZ2d and reconfigures (or requires manual reconfiguration) the resource sub-set consistent with the APS 250 for the resource set including the resource R100a to be added. At block 156, after the resource sub-set has been configured, controller 38 controls the reconfigured sub-set to perform process P1.

Figure 13:
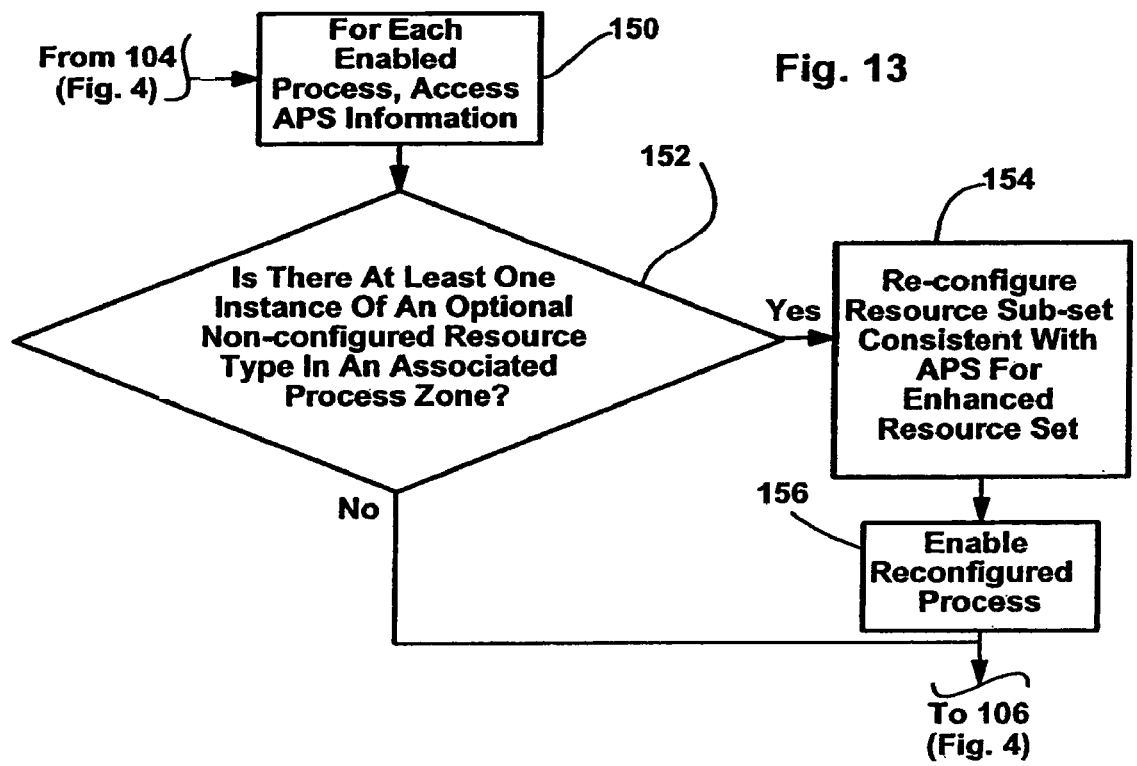
FIG. 13 is a flow chart illustrating a sub-process that may be used to enhance the process of FIG. 4 above.
Figure 14:
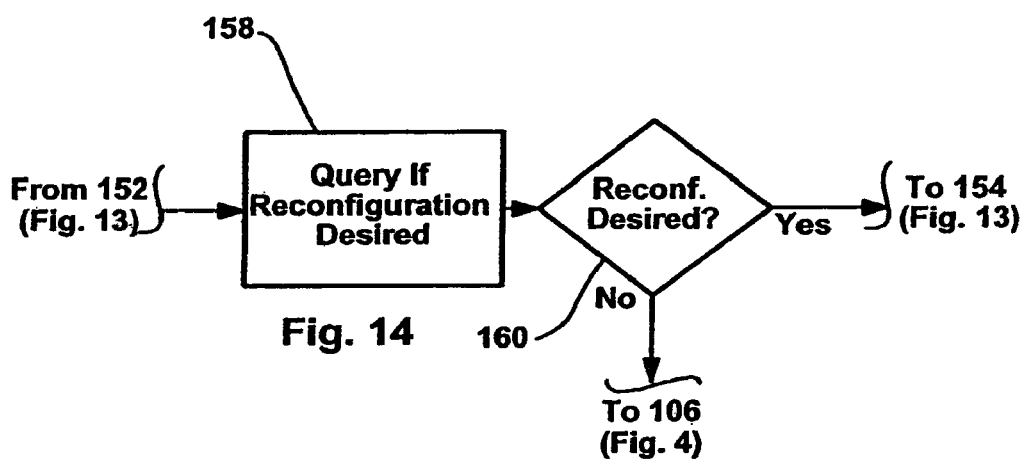
FIG. 14 is a sub-process that may be used to enhance the process of FIG. 13.
Figure 15:
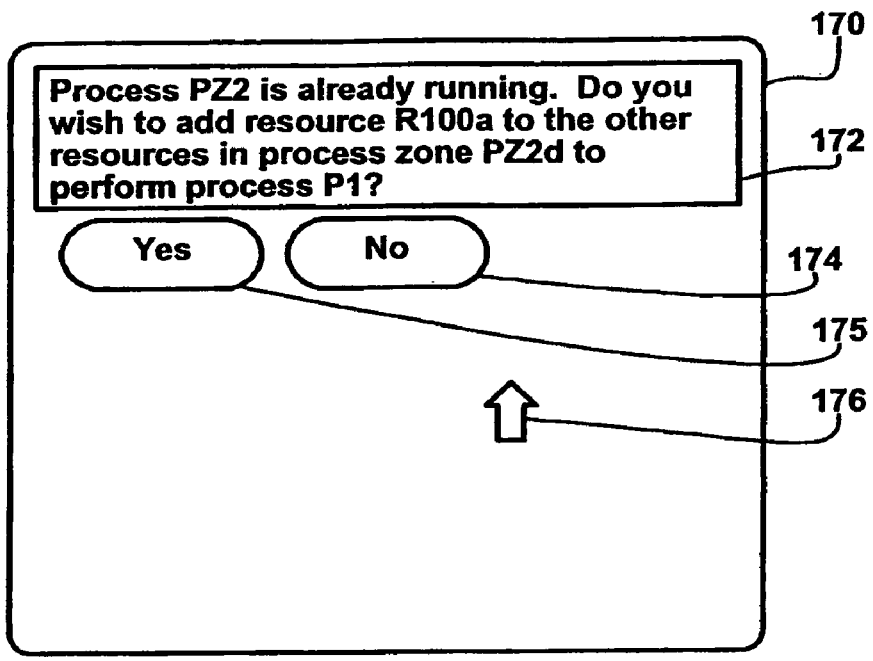
FIG. 15 is an exemplary screen shot that may be used to implement one aspect of the present invention.

Referring now to FIG. 14, a sub-process that may be added to the process of FIG. 13 to provide a system operator the option to reconfigure an enabled sub-set of resources when an optional resource is proximate the enabled sub-set is illustrated. Referring also to FIG. 13, at block 152, when there is at least one instance of an optional non-configured resource present in a process zone associated with an enabled process, control passes to block 158 where a system operator is queried via an interface of some type to determine if the user wishes to reconfigure the resources or have the controller 38 begin the reconfiguration process to add resource R100a to the other resources present. An exemplary query screen shot 170 is illustrated in FIG. 15 including an instruction box 172, selection icons 174 and 175 and a selection cursor 176 for selecting one of the icons 174 and 175. If re-configuration is not selected control passes to block 106 in FIG. 4. However, where reconfiguration is selected at block 160, control passes to block 154 in FIG. 13 where the reconfiguration process commences as described above.

Figure 16:
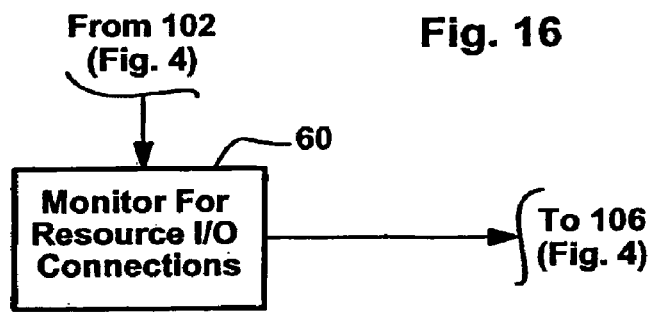
FIG. 16 is a resource location determining sub-process that may comprise a portion of the process of FIG. 4.

While wireless access point type location determination has many advantages, other ways of determining resource location are also contemplated. For example, referring to FIG. 16, a sub-process for identifying machine location which may comprise block 104 in FIG. 4 is illustrated. In this regard, in facilities that do not include access points or some other type of hardware that supports wireless communication and location determination, control may pass from block 102 to block 60 in FIG. 16 where machine location is determined by monitoring machine I/O connections. Here, when a resource is linked to a backplane for communication with controller 38, the controller may interrogate the resource to identify the type of resource and the specific instance of the resource type present. Where a resource is linked to a backplane having a known location, controller 38 assumes that the specific linked resource is located proximate the backplane. After block 60, control passes again to block 106 in FIG. 4 and the process above continues as described.

Figure 17:
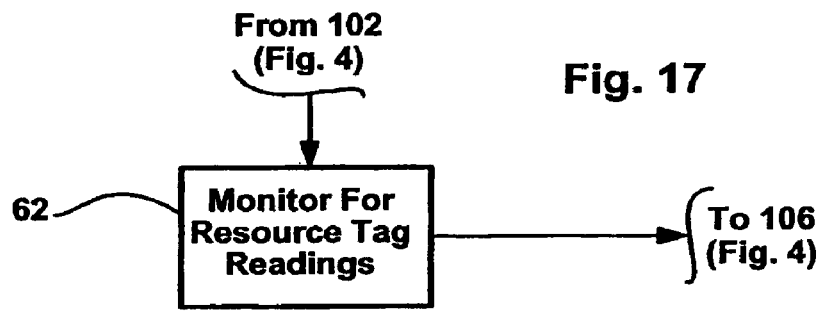
FIG. 17 is similar to FIG. 16, albeit illustrating a second sub-process for determining resource location.

In FIG. 17, yet one other process that may comprise block 104 is illustrated where, from block 102, control passes to block 62 and a resource tag mounted to or secured to a resource is interrogated to identify resource type. Where a machine tag is read at a specific facility location, controller 38 assumes that the resource associated with the tag is proximate the location.

As indicated above, in some embodiments a WID will be provided to facilitate wireless resource monitoring and control which can also be used to determine resource location and to facilitate the configuration process. To this end, FIG. 18a illustrates and exemplary WID 80 including a hardened plastic or metallic housing 84 in which various WID components are mounted. Referring also to FIG. 18b, WID components include a display screen 82, a memory 89, a transmitter 48 and a speaker 151. WID processor 87 is linked to each of screen 82, the input devices, memory 89, transmitter 48 and speaker 151.

The input device may include any of several different types of input components including a typical push-button keyboard 90, separate selection buttons 80 and 86, a rocker-type selection button 92, and/or selectable icons that may be provided via display screen 82 such as, for instance, icons 45. It is contemplated that, in at least one embodiment, a pointing cursor 176 may be movable about screen 82 and placed over one of the selectable icons (e.g., 45) after which a conventional type mouse clicking action may be used to select one of the icons to cause some display or control function to occur. In other embodiments display 82 may comprise a touch screen where icons are selectable via a stylus or the tip of an operators finger.

Display screen 82 may be any type of conventional display screen suitable for a handheld device and, for example, may be equipped to display numeric information, icons, graphs, bar charts, or any other type of monitoring and control information that may be associated with facility machines.

Speaker 151 is a conventional small audio output speaker which may be used for any purpose such as providing an audible indication when a transceiver 48 is removed from a zone, providing operating characteristics in an audible manner, etc.

Transceiver 48 is mounted proximate the top end of housing 84. As in the case of the transceivers that comprise access points 11, transceiver 48 is capable of transmitting electromagnetic signals and also receiving such signals so that information can be provided to controller 38 or received from controller 38 via access points 11.

Memory 89 stores the programs performed by processor 87 and also, in at least some embodiments of the invention, stores a WID identifier (e.g., a WID number, a WID user identification number, etc.).

Referring now to FIG. 19 a sub-process that may be used to identify resource locations and that may replace process blocks 103 and 104 in FIG. 4 is illustrated. Here it is contemplated that resources do not include resource dedicated WRDs 30 but instead include some type of label from which a resource identifier can be obtained and input into a WID 80. In FIG. 4, after a process is associated with at least one associated resource at block 105, control passes to block 328 in FIG. 19 where a WID user obtains the resource identifier from the associated resource via WID 80. The obtaining process may include entering a resource identification number via keyboard 90, reading an RF identification tag from a resource, reading a bar code label attached to a resource, or any other suitable process.

At block 330, WID 80 transmits the resource identifier to controller 38. This transmission may be essentially immediately after the identifier is obtained from the resource so that WID and resource location are essentially identical. At block 332 controller 38 identifies WID location and hence the location of the adjacent resource. Thereafter, control passes back to block 107 in FIG. 4 where a process zone is identified, designated and stored in a process zone map. The resource locating process in FIG. 19 is repeated for each resource brought into an area to be combined with other resources to perform an automated process (e.g., is repeated at block 104 in FIG. 4).

Still other resource location determining protocols may be used with the present invention. For instance, in some cases a system operator may be required to manually determine relative juxtapositions of resources (e.g., manually measure distances between sensors, actuators, etc.) In some cases some locations may be determined automatically via a controller while other locations have to be determined manually.

As indicated above, instead of associating a process with a resource location, facility processes may be directly associated with facility locations. A sub-process to amend the process of FIG. 4 to support this aspect of the invention is illustrated in FIG. 20 which can be used to replace blocks 102, 105, 103 and 107 in FIG. 4. Referring to FIG. 20, at block 300 an APS (e.g., 200 in FIG. 3) is specified. At block 302 facility processes are associated with facility locations and a process zone map is generated and stored for use by controller 38. After block 302 control passes back to block 104 in FIG. 4 where the process continues as described above.

C. Location as a Data Attribute

The embodiments above are generally described in the context of a system including one central controller 38 and resources that do not include separate controllers and/or processors. However, as indicated above, a second set of inventive embodiments contemplated includes distributed controllers or processors that may cooperate to perform automated functions. For example, referring again to FIG. 1*a*, each of resources R1*b*, R2*b*, R6, R7*a* and R101*a* may include its own controller/processor (hereinafter a "programmable resource processor") and associated memory where each resource controller runs programs in an associated memory to control the resource or a group of resources.

Where a system architecture includes distributed controllers that cooperate to perform an automated process, in most cases, the distributed controllers have to communicate at least some information with cooperating controllers to orchestrate and sequence the various cycles and sub-cycles required to complete the process. For instance, where first and second controllers control first and second different resources and the cycle of the first resource cannot begin until the cycle of the second resource has been completed, the second controller has to provide data to the first controller to indicate when the second resource cycle has been completed.

Importantly, the present inventors have recognized that resource location can be used as a data attribute to facilitate connectivity between resources in a distributed control environment. Thus, generally, location can be used in systems that employ either a point-to-point or producer/consumer communication protocol to streamline the configuration process. With respect to producer/consumer type systems, it has been recognized that, where distributed controllers are linked by a network (e.g., Ethernet, wireless LAN, etc.), data generated by resources can be "location tagged" to identify the location at which the data was produced in some fashion prior to transmitting the data onto the network. In addition, resources that require data from resources operating at specific facility locations or relative juxtapositions can be programmed to monitor the network for data tagged as produced at specific locations or relative juxtapositions and thereafter can consume the required data (i.e., employ the data to facilitate a sub-process).

Referring again to FIG. 1*a*, the location tagging aspect of the present invention will be described in the context of resource sub-set 28 including resources R1*b*, R2*b*, R6 and R7*a* and in the context of a configuration process wherein resource R101*a* is moved to a location proximate sub-set 28 resources to combine resource R101*a* with sub-set 28 to perform process P2. In this example it will be assumed that resource R7*a* includes its own distributed controller and is a transfer line while resource R101*a* includes its own distributed controller and is a specific instance of a PCB insertion machine, resource R7*a* has already been positioned within the facility 10 and programmed to perform its part of process P2. Moreover, it will be assumed that resource R7*a* has already been programmed to location tag data generated thereby and to monitor a network (e.g., wireless, hardwired, etc.) for a cycle complete signal from a PCB insertion machine located within zone PZ3*d* and to begin a line transfer cycle only after receiving the cycle complete signal. Furthermore, it will be assumed that the resource R101*a* controller is already programmed to commence an insertion process only after a line transfer cycle complete signal as been received.

In the system assumed above, resource R101*a* is retrieved and moved into a location proximate transfer line R7*a* to perform its insertion sub-process and is linked to a network (e.g., Ethernet) that is common to the resource R7a controller. Next the resource R101a controller determines its location in some fashion. Here, the process for determining controller (e.g., resource) location is irrelevant and any process may be used such as, for instance, a wireless access point based protocol as described above, manual indication by a system operator, determination via a proximate WID, location of network linkage, etc. In this example, it will be assumed that a wireless access point based locating protocol is employed.

In the present example, it will be assumed that line R7a and insertion machine R101a are the only transfer line and insertion machine in subset 28 but that each of sets 24 and 26 (see again FIG. 1a) and possibly other resource sets (not illustrated) on the network shared by set 28 include transfer lines and insertion machines. In this case low resolution location can be used along with other resource characteristics to uniquely identify each of the transfer cycle complete signal and the insertion machine cycle complete signal. For instance, the transfer cycle complete signal generated by line R7a can be uniquely distinguished from other transfer line cycle complete signals on the network via a location tag identifying general zone PZ3d in FIG. 1a. Similarly, the insertion machine cycle complete signal generated by resource R101a can be uniquely distinguished from other insertion machine cycle complete signals on the network via a location tag identifying general zone PZ3d.

Once location of resource R101a has been determined, the resource R101a controller uses the location to supplement its program code so that data generated by resource R101a is location tagged prior to transmission onto the network. In addition, the resource R101a controller program code is altered or supplemented with the location of resource R7a so that the resource R101a controller monitors the network for the cycle complete signal from transfer line R7a at the specific location.

Next, when resource sub-set 28 is activated to perform process P2, consistent with the description above, resource R101a location tags data generated thereby, including its cycle complete signal, with location PZ3d prior to transmitting on the network and monitors network data for a transfer line cycle complete signal location tagged as being provided or generated in location PZ3d. Similarly, line R7a monitors for an insertion machine cycle complete signal produced in zone PZ3d and transmits its data including its cycle complete signal, with location tags indicating location zone PZ3d. When required signals from specific facility locations are obtained the signals are consumed to facilitate respective cycle start functions.

Location resolution requirements are application specific and may vary within a facility based on zone specific characteristics. For instance, on one hand, in the case of a simple resource sub-set like set 28 described above and illustrated in FIG. 1a, location resolution may only have to be general such as, for example, locating resources R7a and R101a within large process zone PZ3d associated with a specific process because each of the line cycle complete and insertion machine cycle complete signals within zone PZ3d can be uniquely characterized within the zone PZ3d.

On the other hand, in more complex systems where network signals are more difficult to distinguish based on non-location attributes, location resolution has to be more precise. For instance, referring again to FIG. 1a, assume that set 28 includes two insertion machines, first insertion machine R101a and a second insertion machine R1b, that second machine R1b includes its own distributed controller that generates a cycle complete signal and that transfer line R7a can be transferred independent of whether or not machine R1b has completed its cycle. Here, if the cycle complete signals from machines R1b and R101a were each tagged with location attribute PZ3d, controller 38 would have no way to distinguish the received signals.

Figure 21:
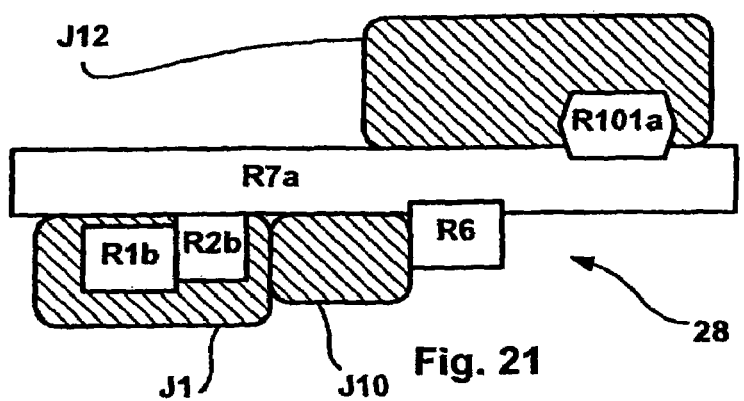
FIG. 21 is a schematic diagram of an exemplary resource subset in a specific juxtaposition.

As indicated above, to avoid the problems associated with multiple similar network signals from distributed controllers, location resolution within each of program codes and location tags can be increased. To this end, referring to FIG. 21, resource sub-set 28 from FIG. 1a has been re-illustrated with resource R101a located within a zone J12 to one side and generally proximate one end of line R7a and resource R1b within a zone J1 to the side and end opposite zone J12. Here, resource R1b and R101a controllers may be tagged with zone specific tags useable to distinguish signals generated within either of zones J1 or J12. In addition, the code performed by the line R7a controller has to support this higher resolution capability by monitoring the network for an insertion machine cycle complete signal from within location J12 after which to start its cycle. Thus, this higher resolution example assumes a pre-existing code exists in the resource R7a controller to monitor for signals from location J12 instead of from larger zone PZ3d.

It should be appreciated that the location resolution can be increased appreciably and, in some applications that warrant, to the point where separate sensors and actuator locations on different machines can be identified and used as signal/data location attributes. The separate sensors and actuators comprise resources and resolution may be taken down to a fraction of an inch where the locating protocol can support such accuracy.

In addition, it should be appreciated that, instead of identifying specific locations or zones in monitoring code and location tags, relative juxtapositions may be used as location tags. For instance, in FIG. 21, where line R7a transfers from left to right as illustrated such that line segments pass from a station adjacent resource R1b to a station adjacent to resource R101a, resources R1b and R101a may be identified as first and second insertion machines to identify their relative juxtapositions or locations with respect to line R7a movement. In a system that tags location via relative juxtaposition and includes controllers that monitor network data in similar fashion the code performed by the R7a controller in FIG. 1a may cause the controller to monitor the network for a cycle complete signal from the second insertion machine within a larger zone PZ3d. In addition, resource R101a location would be identified as second along line R7a within zone PZ3d and data generated thereby would be tagged as such (e.g., the resource R101a cycle complete signal is tagged the second insertion machine cycle complete signal within zone PZ3d or simply the second cycle complete signal within zone PZ3d where there is no other second cycle complete signal generated within zone PZ3d).

It should be appreciated that where location tags indicate relative juxtaposition, location resolution, in many applications, may be less precise than where specific location is included in tags. For example, where there are two PCB insertion machines positioned along a transfer line and ten other machines positioned therebetween along the line, the insertion machines can be uniquely distinguished as first and second with respect to each other instead of by their specific and precise locations.

Figure 22:
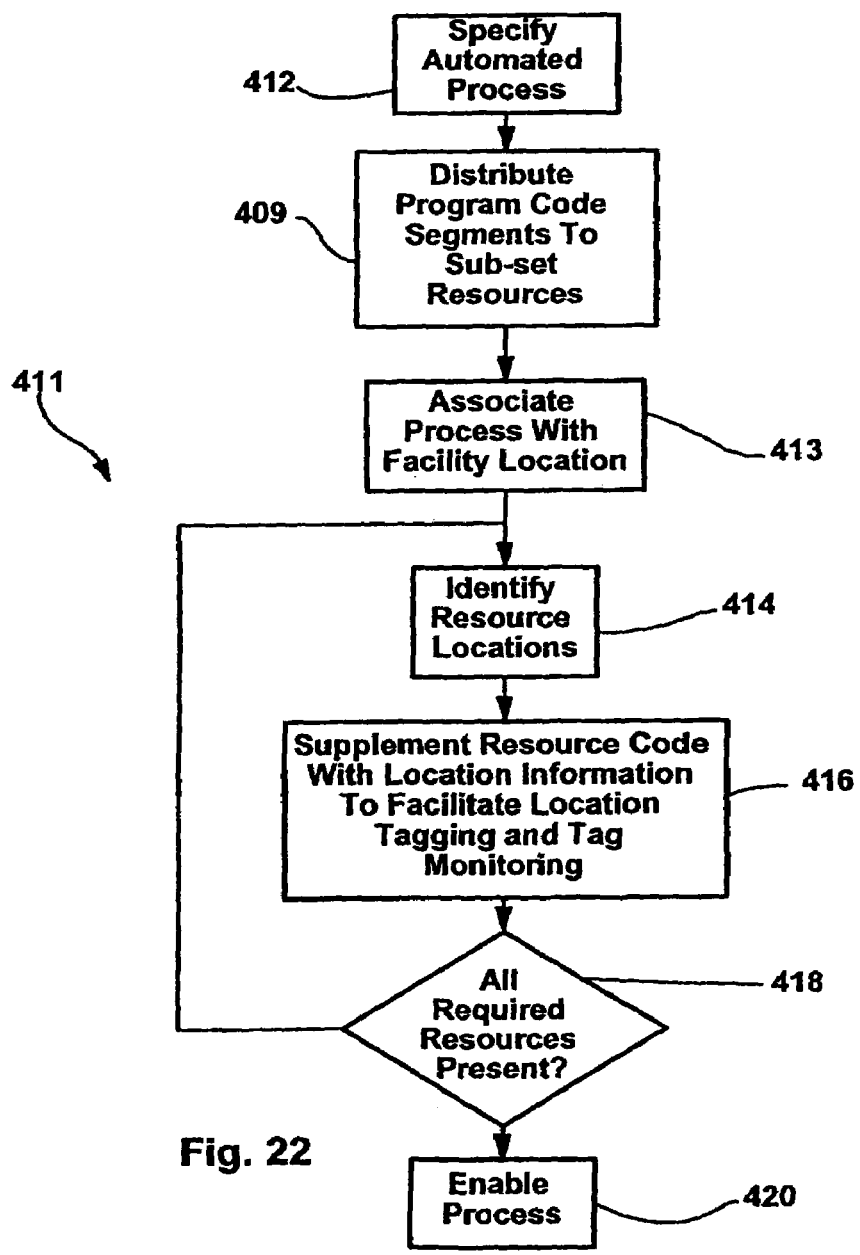
FIG. 22 is a flow chart illustrating an inventive location based data mapping algorithm.

Referring to FIG. 22, a general process 411 for assigning location attribute tags to data and configuring controllers to monitor for location tagged data is illustrated. At block 412, an automated process is specified including program code that indicates data required from relative juxtapositions or facility locations.

At block 409 the program code is separated into code segments to be performed by the distributed controllers and the separate code segments are distributed to the respective controllers. For example, the code segment required to operate transfer line R7*a* is distributed to the resource R7*a* controller, the segment required to operate insertion machine R101*a* is distributed to the resource R101*a* controller and so on.

At block 413 the process specified at block 412 is associated with a specific facility location. Process location association may be performed in any manner such as, for instance, moving one of the resources to be combined to a facility location and indicating that the resource should be associated with the specific process via some type of interface. For example, referring again to FIG. 1*a*, a user may position transfer line R7*a* as illustrated and indicate association of line R7*a* with process P2.

Next at block 414 system controllers cooperate to identify resource locations. At block 416 resource locations are used to supplement the code segments so that the segments cause respective controllers to tag data produced thereby with location tags and to monitor network data produced at specific locations. As additional resources are configured, location attributes are updated in code segments.

At block 418, a system controller (e.g., controller 38) determines if all resources required to perform the process are present at required locations and have been supplemented with required location information. Where additional resources are required control passes back up to block 414 and the illustrated loop is repeated. When all resources are present and code segments have been supplemented with required location information control passes to block 420 where the process is enabled.

Figure 23:
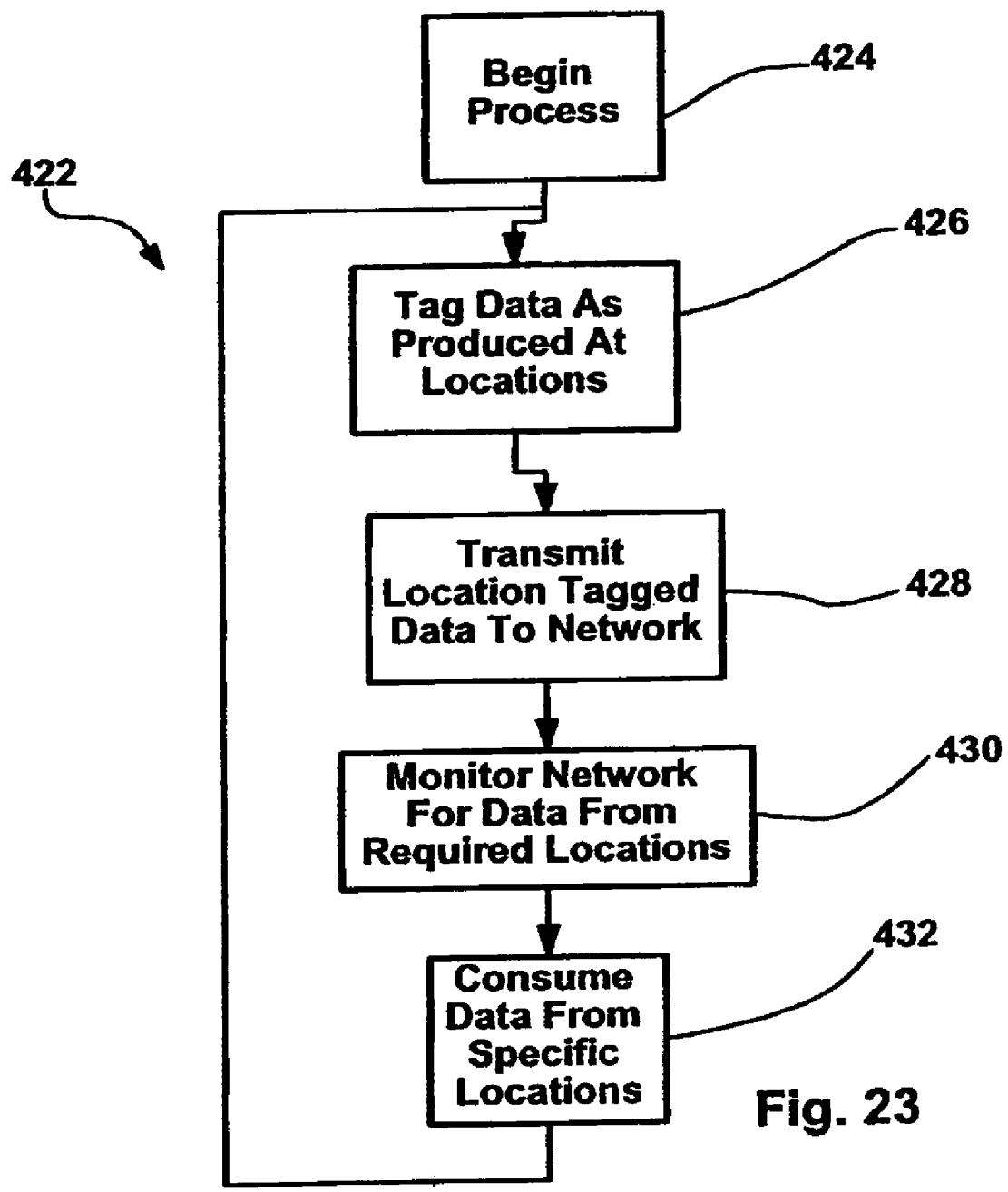
FIG. 23 is a flow chart illustrating and inventive location based tagging and monitoring algorithm.

Referring now to FIG. 23, after a process has been enabled, the exemplary process 422 illustrated may be performed by each distributed processor. At block 424, the enabled process (e.g., P2) begins. At block 426 controllers tag data as produced at resource locations and at block 428 location tagged data is transmitted onto the network. At block 430 each controller linked to the network monitors for location tagged data required by the controller's code segment and at block 432, when required location tagged data is received, the receiving controller consumes the data.

In some embodiments the location based programming and data tagging concepts described above may be combined to facilitate particularly advantageous systems. Thus, for instance, resources may not be pre-programmed to perform specific code segments as described above but instead, may be automatically programmed when a resource is brought to a location to be combined with other resources to perform a process. For example, referring again to FIG. 1*a*, assume resource R7*a* is the first resource brought to the illustrated location to be combined with the other resources in sub-set 28 to perform process P2 and that initially the resource R7*a* controller is not programmed with process specific code. Here, once an operator indicates that resource R7*a* is to be associated with process P2, the system (e.g., central controller 38) identifies resource R7*a* location and type, identifies process P2 code segments, identifies one of the code segments to be performed by a resource of the type R7, alters or supplements the identified code segment as a function of the specific location of resource R7*a* to facilitate data location tagging and network location based monitoring and then downloads the location enhanced code segment to the resource R7*a* controller. A similar process is performed when each of the other resources in sub-set 28 are retrieved and brought to required relative juxtapositions with respect to resource R7*a*.

Figure 24:
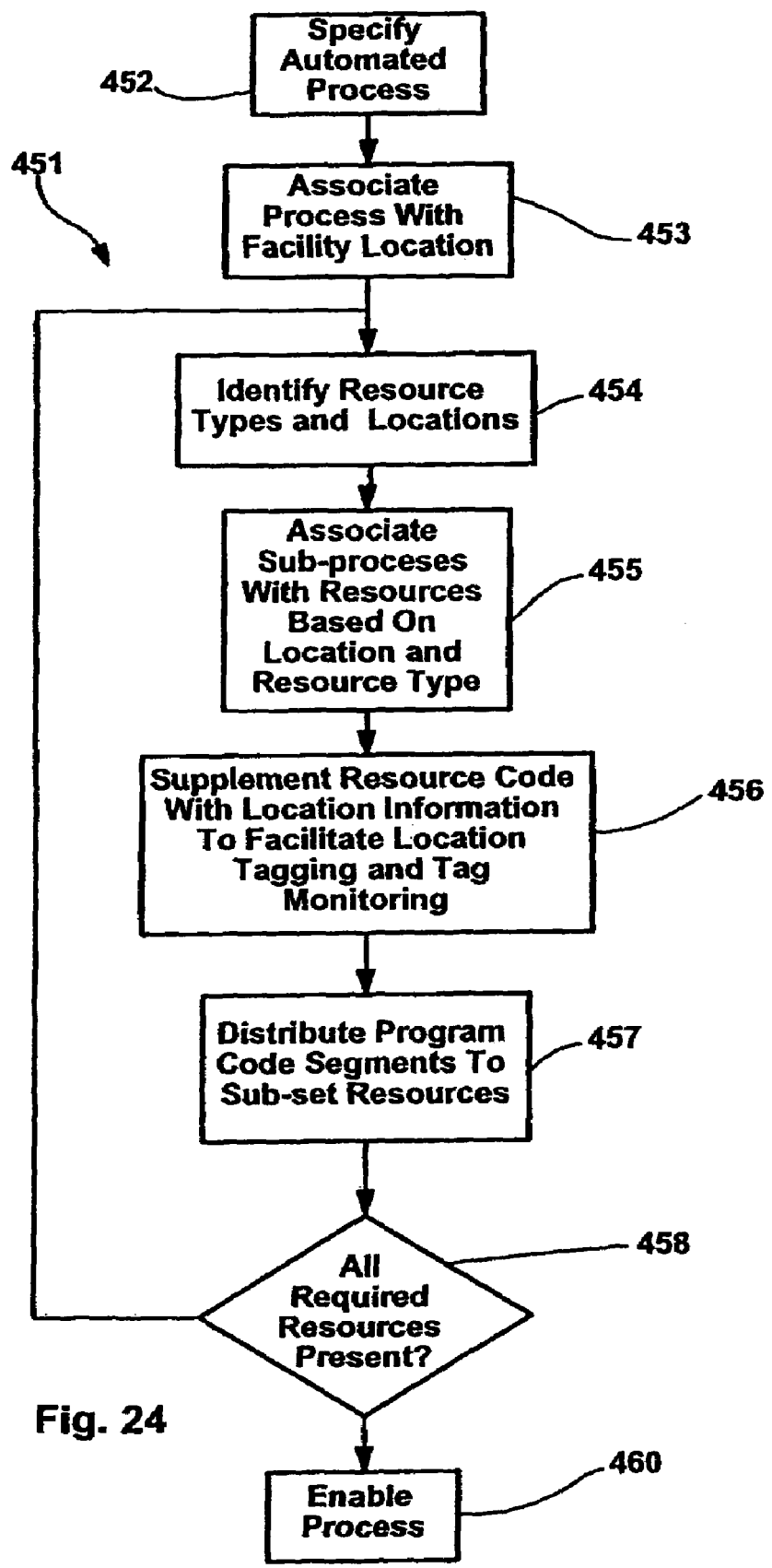
FIG. 24 is a flow chart similar to the chart of FIG. 22 including a location based controller programming sub-process.

Referring now to FIG. 24, an exemplary process 451 wherein controller code is location enabled and downloaded to controllers automatically based on location is illustrated. At block 452, an automated process code including location monitoring requirements is specified. At block 453 the process is associated with a specific facility location. At block 454, as resources are positioned at or proximate the associated facility location, the resource locations and types are determined (e.g. through reading of resource type tags, wireless transmission of such tags, etc.). At block 455 sub-processes of the specified process are associated with each of the controllers based on resource type and location.

Continuing, at block 456 the code segments are supplemented to render the segments location enabled. Thus, segments are supplemented so that each controller will tag data with location specific tags and to monitor network data for location tagged data from specific resource types at specific or relative facility locations. At block 457 the location enabled code is distributed to respective associated controllers. At block 458, where additional resources are required, control passes back to block 454 where the loop is repeated. When all required resources are present and location enhanced code segments have been downloaded, control passes to block 460 where the sub-set is enabled to perform the process.

As indicated above, in some embodiments a single controller may control several resources. For instance in FIG. 1*a*, controller 38 may control all of resources R1*b*, R2*b*, R6 and R7*a*. Where a single controller controls several resources, depending upon system architecture and program requirements, the single controller may tag data prior to transmitting the data on the network with a location attribute that either indicates the specific location of the data producing resource or indicates the location of the controller itself. For example, a single controller may have one-hundred different sensors and one-hundred different actuators linked thereto where the sensors and actuators are located in a small space such that location attributes are difficult to use to distinguish related data. In this case the location tags provided by the controller may specify controller location and other data attributes would be relied upon to distinguish data. However, where a single controller controls only a small number of resources that are spatially separate, location tags may be resource specific and other data attributes would not have to be relied upon.

One wrinkle of complexity is added to the systems above in cases where a single resource may be located at more than one location and perform its part of an overall process but where the sub-process performed varies as a function to location. For example, referring again to FIG. 21, assume resource R101*a* may be positionable in either of zones J10 or J12 to perform its part of process P2, when resource R101*a* is in zone J12, the resource R101*a* controller only requires a single signal corresponding to a resource R7*a* cycle completion but that when resource R101*a* is in zone J10, the resource R101*a* controller requires both a resource R7*a* cycle complete signal and a resource R2*b* cycle complete signal prior to beginning its cycle. Here, different resource sub-processors have to be associated with the resource R101*a* controller based on the relative juxtaposition of resource R101*a* to transfer line R7*a* and other sub-set 28 resources.

In this example the process 451 illustrated in FIG. 24 may be used to identify location specific sub-processes for sub-set resources. Here, some of the process 451 steps would be slightly more complicated. For instance, specifying step 452 may include specifying more than one sub-process for each resource required to perform the overall process where the sub-processes are location specific. In addition, block 455 would entail selecting one of the sub-processes for a resource based on resource location. Other process 451 steps would be performed in a manner similar to that described above.

It should be appreciated that other protocols for providing location specific code segments to specific resource processors are contemplated. For instance, code segments may be altered in ways other than supplementing the segments with location specific data. For example, where resource 101a components would interfere with resource R2b components when resource R101a is in zone J10, the paths followed by resource R101a components or resource R2b components may be altered when resource R101a is located in zone J10. This modification may be to existing code segments as opposed to a wholesale replacement of the code segment.

While very simple producer/consumer location based aspects of the present invention are described above it should be appreciated that far more complex and useful applications are contemplated. For instance, where a resource is used to provide a raw material to a resource sub-set during a process, material requirements at specific facility locations may be tied to procurement resources to make sure that materials required for a process are delivered on a timely basis. For example, a plastic pellet dryer/auger machine may include a pellet volume sensor that senses the rate at which a rotational mold process is using pellets. Here, location specific pellet procurement can be automated as a function of pellet volume remaining and rate of pellet use.

As another instance, an interface that supports status based diagnostics (i.e., reports instantaneous states or statuses of actuators, sensors, etc.) may be programmed to consume all status based network signals that originate (e.g., are produced) within a specific process zone. Here, as additional resources are added to a sub-set to perform a process, the additional resources generate status based diagnostic messages on the system network that are tagged with location (e.g., process zone) information. Thereafter the processor controlling the interface monitors network messages to identify diagnostic data originating from within an associated zone and presents diagnostic messages via the interface.

As yet another instance, referring again to FIG. 1a, it may be desirable that all fault conditions associated with any resource within process zone PZ3d be displayed on a WID display when the WID is located within machine zone MZ3d. Here, fault messages generated by resources R1b, R2b, R6 and/or R7a may be recognized by controller 38 as being generated by resources within zone PZ3d and may be tagged with a location tag specifying machine zone MZ3d. As discussed above, controller 38 access points 11 and WID 80 can cooperate to determine WID location. Thus, WID 80 can be programmed to consume fault messages produced by processors associated with resources in process zone PZ3d when WID 80 is in machine zone MZ3d. Again, if resource R101a is brought into zone PZ3d and configured to cooperate with sub-set 28, WID 80 will automatically use location tags of fault messages from the resource R101a processor to report associated faults when WID80 is in zone PZ3d.

According to another aspect of the present invention, after resources have been associated with specific sub-processes and have been located relative to other resources to facilitate a process, where resources have resource specific network addresses (e.g., Ethernet addresses), the resource code segments may be altered in a manner similar to the manner described above to render code segments "address enabled" instead of location enabled.

A sub-process that may replace block 456 in FIG. 24 is illustrated in FIG. 25 that instantiates sub-process code segments with network addresses after sub-processes are associated with specific resources based on resource locations. Referring also to FIG. 24, after sub-processes have been associated with resources as a function of resource location at block 455 control passes to block 464 in FIG. 25 where resource network addresses are associated with the resources. Next, at block 466 resource code is supplemented with resource addresses to facilitate tagging and tag monitoring. In this regard code is supplemented to tag data generated by respective controllers with network addresses of associated resources. For instance, the code segment for the resource R101a in FIG. 1a is supplemented to tag data generated thereby as being produced by resource R101a. In addition, code corresponding to sub-processes requiring data from specific locations is supplemented to monitor the network for data produced by resources at the network addresses associated with the specific locations. For instance, in FIG. 1a where a code segment corresponding to resource R101a requires a transfer line cycle complete signal from a transfer line within zone PZ3d prior to initiating its cycle, the code segment is altered to require a cycle complete signal from the resource at the unique network address associated with resource R7a.

After block 466 control passes to block 457 in FIG. 24 where process 451 is continued until all code segments and address enabled and downloaded to respective resource controllers.

In the address enabling example above, while address enabling is advantageous as the resulting communication protocol is consistent with many exemplary standard protocols, it should be appreciated that, in at least some embodiments of the invention, a database of resource locations should still be maintained even after address enablement. To this end, in cases where additional resources may be added to a resource sub-set or one or more sub-set resources may be replaced during system maintenance, the resource location information may be required to configure and enable the resources added to the sub-set. For instance, referring again to FIG. 21, assume resource R101a has to be replaced with a different instance, R101b of the same resource. In this case, after sub-set 28 has been halted, resource R101a has been de-linked from the sub-set and resource R101b (not illustrated) has been retrieved and located in an operating position, the locating and associating processes described above have to be repeated for the new resource R101b and any other resources that require data from resource 101b. The stored locations of sub-set resources facilitate this process. In cases where the resource locating potential is manual or partially manual the stored location data streamlines the process.

In other embodiments, when a resource configuration is altered in any manner by changing resource juxtaposition, the entire process of FIGS. 24 and 25 may be repeated to re-locate and re-associate as described above.

According to yet one more aspect of the present invention, after location based resource/sub-process association, resource code segments may be altered in a manner similar to the manner described above to render code segments "sub-process enabled" instead of location or address enabled. To this end, resource controllers may tag data with unique sub-process tags instead of network addresses or locations prior to network transmission. In addition, here, resource controller code segments would be supplemented such that associated controllers monitor network data associated with sub-processes instead of locations and addresses. Again, required data from specific sub-processes is consumed when identified.

Generally, it should be appreciated that each of the producer/consumer communication protocols above is enhanced by using location as an attribute to either directly or indirectly facilitate automated code modifications and data communications.

In addition it should be recognized that the advantages described above are also obtainable in the case of point-to-point communication systems where location or some aspect akin thereto (e.g., relative juxtaposition) is useable to supplement code segments and route network data to and from distributed controllers. In point-to-point systems initial code segments include references to relative resource locations which are then replaced by specific network addresses after resources are oriented for operation at specific facility locations.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. For example, various aspects of the present invention may be implemented without requiring designation of process zones. Thus, for instance, resource locations may be determined through backplane connections (e.g., the locations of backplanes to which resources are connected), stationary tag or bar code readers or in any other suitable manner via virtually any type of location determiner. In these cases process zones would not be required for certain inventive aspects. As another example, while most of the embodiments described above are described in the context of resources that are hardwired to controller 38 via bus 34, other embodiments are contemplated wherein a sub-set of the resources or, in some cases, all of the resources may be wirelessly linked to controller 38. Moreover, the term location above is used in a broad and application specific context such that, in some applications where precise location resolution is required the term may be synonymous with a precise facility location while in other applications location or the phrase physical location may be synonymous with relative juxtaposition of a resource to one or a sub-set of other resources. The disclosure is intended to cover by the appended claims all such modifications that fall within the scope of the claims.

To apprise the public of the scope of this invention, the following claims are made:

What is claimed is:

1. A method for facilitating automation resource configuration in an industrial automation environment, the method comprising the steps of:
dynamically identifying relative positions of automation resource locations compared to other automation resource locations within a physical space;
the automation resources to be combined to perform an automation process within the physical space, wherein the automation process includes a plurality of sub-processes within the automation process; and
automatically associating at least one of the sub-processes with each automation resource as a function of the automation resource locations, wherein the associated sub-process is to be performed by the associated automation resource.

2. The method of claim 1 wherein at least a sub-set of the automation resources are programmable and wherein each sub-process is associated with a sub-process program code and wherein the step of associating includes the step of programming the programmable resources with the sub-process program codes.

3. The method of claim 1 further including the steps of, after sub-process association, monitoring automation resource locations and, when at least one automation resource location is altered, providing an indication that the at least one automation resource location has been altered.

4. The method of claim 3 wherein at least a sub-set of the automation resources are programmable and each sub-process is associated with a sub-process program code and wherein the step of associating includes the step of programming the programmable resources with the sub-process program codes and, wherein, the step of providing an indication includes re-programming at least one of the programmable resources as a function of the automation resource location change.

5. The method of claim 1 wherein the automation process is an automated process and wherein the step of associating the sub-processes with the automation resources includes associated separate automated sub-processes as a function of the automation resource locations.

6. The method of claim 1 further including the step of providing a transmitter for each of the automation resources to be combined, the step of identifying automation resource locations including causing the automation resources to transmit signals within the physical space, receiving the signals and using the transmitted signals to identify automation resource locations.

7. The method of claim 6 further including the step of providing access points within the physical space, the step of receiving the transmitted signals including receiving the signals at the access points.

8. The method of claim 1 wherein the step of identifying automation resource locations includes the steps of, for each automation resource, providing a wireless information device that includes a transmitter, positioning the wireless information device proximate the automation resource, causing the wireless information device to transmit a signal, receiving the transmitted signal and using the received signal to identify automation resource locations.

9. The method of claim 1 further including the steps of, for each sub-process associated with an automation resource, providing information about the sub-process to a system operator.

10. The method of claim 9 wherein the information provided includes at least one of (i) information confirming that the automation resource is to be combined with other proximate resources, (ii) information instructing the operator how to combine the automation resource, (iii) information usable by a controller to control the automation resource, (iv) information regarding required I/O linkages, (v) information to configure at least one interface to be associated with the automation resource, (vi) information for performing diagnostics on the automation resource, and (vii) information for programming the automation resource to perform a portion of the automation process.

11. The method of claim 9 wherein the information provided includes information confirming that the automation resource is to be combined with other proximate automation resources.

12. The method of claim 9 wherein the information provided includes information instructing the operator how to combine the automation resource.

13. A system for facilitating automation resource configuration in an industrial automation environment, the system comprising:
a processor programmed to:
dynamically identifying relative positions of automation resource locations compared to other automation resource locations within a physical space;
the automation resources to be combined to perform an automation process within the physical space, wherein the automation process includes a plurality of sub-processes within the automation process; and
automatically associating at least one of the sub-processes with each automation resource as a function of the automation resource locations, wherein the associated sub-process is to be performed by the associated automation resource.

14. The system of claim 13 wherein at least a sub-set of the automation resources are programmable and wherein each sub-process is associated with a sub-process program code and wherein the processor associates by programming the programmable automation resources with the sub-process program codes.

15. The system of claim 13 further including a location determiner and an indicator, each of the determiner and indicator linkable to the processor, the determiner for determining automation resource locations, wherein, the processor is further programmed to, after sub-process association, monitor automation resource locations and, when at least one automation resource location is altered, provide an indication via the indicator that the at least one automation location has been altered.

16. The system of claim 15 wherein at least a sub-set of the automation resources are programmable and each sub-process is associated with a sub-process program code and wherein the processor associates by programming the programmable automation resources with the sub-process program codes, the processor further re-programming at least one of the programmable resources as a function of an automation resource location change.

17. The system of claim 13 wherein each of the automation resources includes a transmitter that transmits signals within the space, the processor receiving the signals and using the transmitted signals to identify automation resource locations.

18. The system of claim 17 wherein access points are located within the physical space and are linked to the processor, the processor receiving the transmitted signals via the access points.

19. The system of claim 13 further including a wireless information device that includes a transmitter that can transmit a signal from a location proximate an automation resource, the processor identifying the automation resource location by receiving the transmitted signal and using the received signal to identify the automation resource location.

20. The system of claim 13 wherein the processor further, for each sub-process associated with an automation resource, providing information about the sub-process to a system operator.

21. The system of claim 20 wherein the information provided includes at least one of (i) information confirming that the automation resource is to be combined with other proximate resources, (ii) information instructing the operator how to combine the automation resource, (iii) information usable by a controller to control the automation resource, (iv) information regarding required I/O linkages, (v) information to configure at least one interface to be associated with the automation resource, (vi) information for performing diagnostics on the automation resource, and (vii) information for programming the automation resource to perform a portion of the automation process.

22. The system of claim 20 wherein the information provided includes information confirming that the automation resource is to be combined with other proximate automation resources.

23. The system of claim 20 wherein the information provided includes information instructing the operator how to combine the automation resource.

* * * * *